US012298415B2

(12) United States Patent
Kubwimana et al.

(10) Patent No.: US 12,298,415 B2
(45) Date of Patent: May 13, 2025

(54) DUAL-POLARIZED, RIDGED WAVEGUIDE MAGIC-T FED, WIDEBAND CHEVRON SLOT PAIR ANTENNA ELEMENT FOR DIRECTION FINDING APPLICATIONS

(71) Applicant: BAE Systems Information and Electronic Systems Integration Inc., Nashua, NH (US)

(72) Inventors: Jean L. Kubwimana, Merrimack, NH (US); Nicholas C. Denno, Nashua, NH (US); Luke D. St. Martin, Lunenburg, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 429 days.

(21) Appl. No.: 17/933,973

(22) Filed: Sep. 21, 2022

(65) Prior Publication Data

US 2024/0094323 A1 Mar. 21, 2024

(51) Int. Cl.
*H01Q 1/42* (2006.01)
*G01S 3/04* (2006.01)
*H01Q 1/48* (2006.01)
*H01Q 13/10* (2006.01)

(52) U.S. Cl.
CPC ............ *G01S 3/043* (2013.01); *H01Q 1/42* (2013.01); *H01Q 1/48* (2013.01); *H01Q 13/10* (2013.01)

(58) Field of Classification Search
CPC ............ H01Q 1/42; H01Q 1/48; H01Q 13/10; H01Q 21/24; H01Q 25/001
See application file for complete search history.

(56) References Cited

U.S. PATENT DOCUMENTS

| 4,376,281 | A | * | 3/1983 | Smith | H01Q 25/002 |
| | | | | | 343/768 |
| 4,716,415 | A | * | 12/1987 | Kelly | H01Q 25/001 |
| | | | | | 343/770 |
| 11,005,185 | B2 | | 5/2021 | Howarth et al. | |
| 2011/0304508 | A1 | * | 12/2011 | Remez | H01Q 13/02 |
| | | | | | 342/442 |

FOREIGN PATENT DOCUMENTS

CN 112909513 A * 6/2021 ............ H01Q 1/36

* cited by examiner

*Primary Examiner* — Hoang V Nguyen
(74) *Attorney, Agent, or Firm* — Sand, Sebolt & Wernow LPA

(57) ABSTRACT

An antenna element suited for direction finding (DF) with omni-directional radiation patterns utilizing a pair of chevron slots fed using a ridged waveguide magic tee (magic-t) and connected microstrip probes. The provided antenna element provides improved performance, power handling, and improved bandwidth compared to current monocone and/or slot antenna elements. The antenna element may be further realized utilizing additive manufacturing processes in combination with standard metal and polymer production techniques.

20 Claims, 20 Drawing Sheets

DUAL-POLARIZED, RIDGED WAVEGUIDE MAGIC-T FED, WIDEBAND CHEVRON SLOT PAIR ANTENNA ELEMENT FOR DIRECTION FINDING APPLICATIONS

TECHNICAL FIELD

The present disclosure relates generally to antenna elements suitable for use in direction finding and similar applications. More particularly, in one example, the present disclosure relates to two port antenna elements with omni-directional radiation patterns suitable for use in direction finding and similar applications. Specifically, in another example, the present disclosure relates to a two port antenna element utilizing a pair of chevron slots fed using a ridged waveguide magic tee (magic-t) feed to generate independent vertical (V-pol) and horizontal polarized (H-pol) omni-directional radiation patterns for use in direction finding and similar systems.

BACKGROUND

The process of locating the source of an emitted signal, which is known as direction finding (DF), is common to many applications. For example, direction finding may be used in navigation, search and rescue, tracking wildlife, and locating illegal transmitters. In military applications, direction finding helps in target acquisition and tracking of enemy locations and movements, as well as threat tracking and threat avoidance. Nearly all modern militaries use some form of DF to guide their ships, aircraft, troops, and/or munitions and in one or more ways. For example, direction finding is the process by which enemy emitters are detected and/or geolocated, thus providing information to military operators as to the location and type of emitter being used, which can further be used to identify enemy units and/or troops and the movements thereof.

Direction finding is typically performed utilizing one or more antennas or antenna arrays operable to detect a signal with an unknown direction of origin. The detected signal characteristics can provide information to the receiving system allowing that system to determine the location of the source of that signal. For example, a mobile unit emitting a radar signal may be detected and located by tracing the direction of the signal back to its origin.

As emitter systems become more complex and emitters become more agile in their movements and in their signal masking abilities, there is an ever evolving need to improve the detection abilities of DF systems. Many current solutions utilize existing antenna arrays and antenna types and rely on backend data processing to improve DF results. Ideally, antenna elements used for DF would be dual-polarized and would provide omni-directional vertically polarized (V-pol) and horizontally polarized (H-pol) radiation. Some examples of current omni-directional antenna elements being utilized for DF can include various monocone antennas and/or various slot antennas.

In systems utilizing monocone antenna elements, these monocone elements tends to be linearly polarized along the element axis and must be slanted in order to provide omni-directional V-pol and H-pol radiation. While slanting the monocone element provides omni-directional V-pol and H-pol radiation capabilities, the slanting of the monocone results in polarization loss at specific azimuths. This causes monocone elements to be difficult to employ in conformal applications, thus limiting their use as these more complex and more agile emitters emerge.

Some current solutions that utilize slot antennas tend to use an in-phase microstrip feed for two orthogonally arranged slot elements, resulting in an omni-directional V-pol radiation pattern and an H-pol radiation pattern that features deep nulls across the field of view. In addition, some of these slot antennas can be bandwidth limited, and further suffer in their ability to handle power from the use of small push-on connectors. These small push-on connectors are commonly known to be mechanically difficult to control and further introduce a source of radio frequency (RF) leakage in several applications. As with monocone antennas, the limitations of current slot antennas make them less effective and therefore less desirable as more complex and more agile emitters emerge in the landscape.

SUMMARY

To address these and other issues, the present disclosure may provide an antenna element suited for direction finding (DF) with omni-directional radiation patterns utilizing a pair of chevron slots fed using a ridged waveguide magic tee (magic-t) and connected microstrip probes. The provided antenna element provides improved performance, power handling, and improved bandwidth compared to existing monocone and/or slot antenna elements. The antenna element may be further realized utilizing additive manufacturing processes in combination with standard metal and polymer production techniques.

In one aspect, an exemplary embodiment of the present disclosure may provide an antenna element comprising: a slot plate defining a first slot and a second slot therethrough, the first and second slots arranged orthogonally relative to each other; a first element port in operable communication with the slot plate and the first slot; a first parallel plate pair on the first element port and in operable communication with the slot plate; a second element port in operable communication with the slot plate and the second slot; a second parallel plate pair on the second element port and in operable communication with the slot plate; a cup defining an air cavity below the slot plate and containing the first and second element ports and first and second parallel plate pairs therein; a difference port in operable connection with a first microstrip probe board; a sum port in operable connection with a second microstrip probe board; and a four-port hybrid magic tee (magic-t) waveguide feed operable to feed the first element port, the second element port, the difference port, and the sum port. This exemplary embodiment or another exemplary embodiment may further provide wherein the waveguide magic-t further comprises: a first port transition section operable to connect a first element feed with the first element port; and a second port transition section operable to connect a second element feed with the second element port; wherein the first and second transition sections allow the waveguide magic-t to transition from the first and second ports to a traditional waveguide at the first and second element feeds. This exemplary embodiment or another exemplary embodiment may further provide wherein the waveguide magic-t further comprises: a third transition section in operable communication with the difference port; and a fourth transition section in operable communication with the sum port. This exemplary embodiment or another exemplary embodiment may further provide wherein the first and second parallel plate pairs each further comprise: a first end in operable communication with the slot plate; and a second end opposite the first end; wherein the first end has a thickness that is greater than a thickness of the second end. This exemplary embodiment or another exemplary embodiment may further provide a radome in operable communication with the slot plate. This exemplary embodiment or another exemplary embodiment may further provide wherein the radome further comprises: a first slot projection extending into the first slot defined through the slot plate; and a second slot projection extending into the second slot defined through the slot plate. This exemplary embodiment or another exemplary embodiment may further provide wherein the first slot projection extends through the first slot and is in contact with the first element port and the second slot projection extends through the second slot and is in contact with the second element port. This exemplary embodiment or another exemplary embodiment may further provide further comprising: a ground plane. This exemplary embodiment or another exemplary embodiment may further provide wherein the radome is embedded in the ground plane and is substantially planar therewith. This exemplary embodiment or another exemplary embodiment may further provide wherein the antenna element is conformal with the ground plane.

In another aspect, an exemplary embodiment of the present disclosure may provide an antenna element comprising: a slot plate defining a first slot and a second slot therethrough, the first and second slots arranged orthogonally relative to each other; a first element port in operable communication with the slot plate and the first slot; a second element port in operable communication with the slot plate and the second slot; a difference port in operable connection with a first microstrip probe board; a sum port in operable connection with a second microstrip probe board; and a four-port hybrid magic tee (magic-t) waveguide feed operable to feed the first element port, the second element port, the difference port, and the sum port. This exemplary embodiment or another exemplary embodiment may further provide wherein the waveguide magic-t further comprises: a first port transition section operable to connect a first element feed with the first element port; and a second port transition section operable to connect a second element feed with the second element port; wherein the first and second transition sections allow the waveguide magic-t to transition to the first and second ports from a traditional waveguide at the first and second element feeds. This exemplary embodiment or another exemplary embodiment may further provide wherein the waveguide magic-t further comprises: a third transition section in operable communication with the difference port; and a fourth transition section in operable communication with the sum port. This exemplary embodiment or another exemplary embodiment may further provide wherein the first port transition section further comprises: a ridged waveguide transitioning from the first element feed directly to the first element port and to the first slot defined in the slot plate. This exemplary embodiment or another exemplary embodiment may further provide wherein the second port transition section further comprises: a ridged waveguide transitioning from the second element feed directly to the second element port and to the second slot defined in the slot plate. This exemplary embodiment or another exemplary embodiment may further provide a radome in operable communication with the slot plate. This exemplary embodiment or another exemplary embodiment may further provide wherein the radome further comprises: a first slot projection extending into the first slot defined through the slot plate; and a second slot projection extending into the second slot defined through the slot plate. This exemplary embodiment or another exemplary embodiment may further provide wherein the first slot projection extends through the first slot and is in contact with the first element port and the second slot projection extends through the second slot and is in contact with the second element port. This exemplary embodiment or another exemplary embodiment may further provide a ground plane; wherein the radome is embedded in the ground plane and is substantially planar therewith. This exemplary embodiment or another exemplary embodiment may further provide wherein the antenna element is conformal with the ground plane.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

Figure 1:
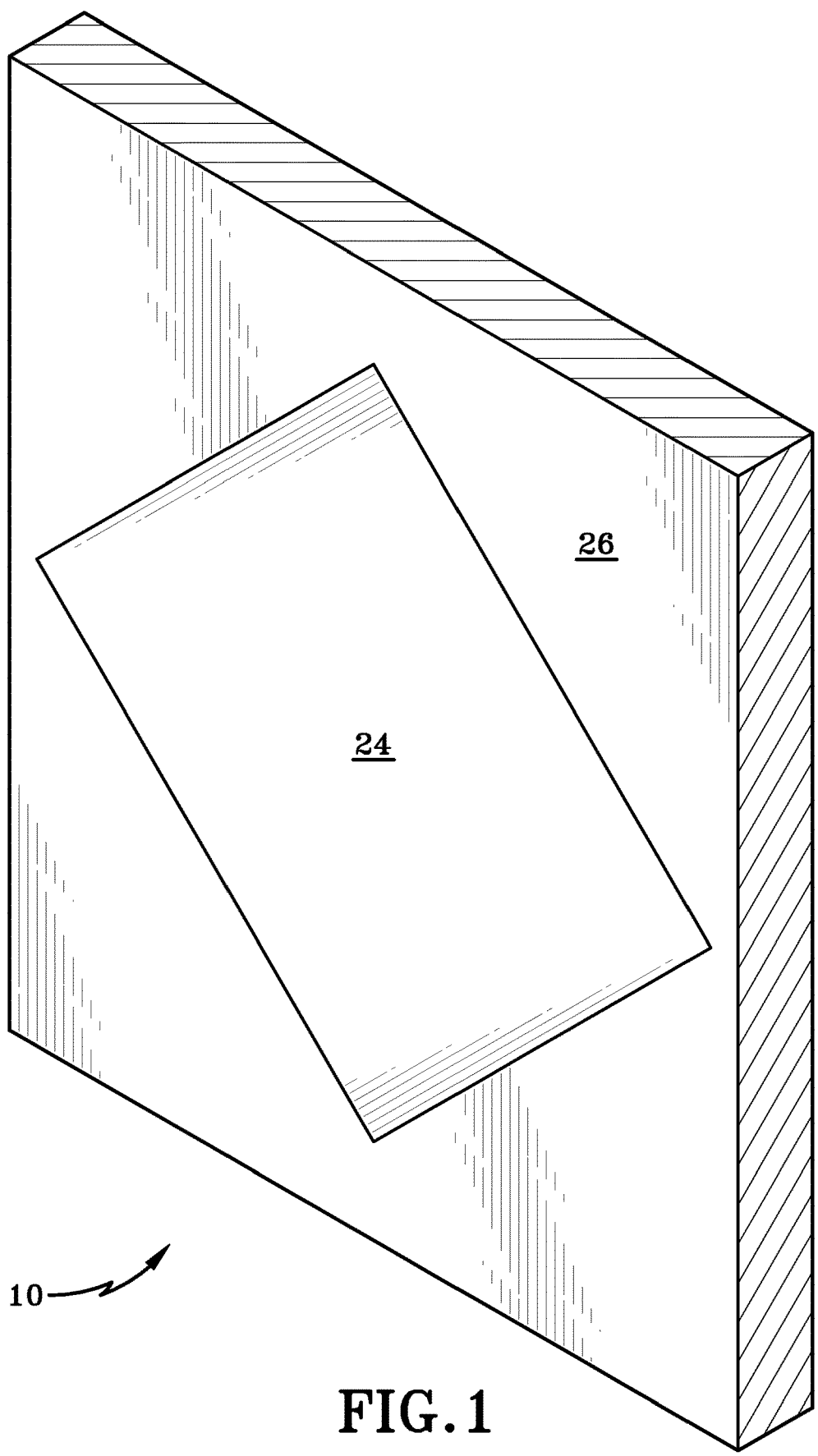
FIG. 1 is a front isometric perspective view of a first embodiment of an antenna element, according to one aspect of the present disclosure.

With reference generally to the figures, an antenna element for use in direction finding and other similar applications is shown and generally indicated at reference 10. Antenna element 10 may generally be a dual-slot/dual-polarized wideband antenna element and may have a first element port 12 and a second element port 14, both of which may be fed utilizing a ridged waveguide magic tee (magic-t) feed 16, as discussed further below. Antenna element 10 may further include a difference (Δ) port 18, which may be a horizontal polarization (H-pol) or cross polarized port and a sum (Σ) port 20, which may be a vertical polarization (V-pol) or co-polarized port, both of which may likewise be fed by or otherwise connected to magic-t feed 16, as discussed further below. Antenna element 10 may further include a slot plate 22 and a radome 24, both of which may be embedded in or otherwise connected to a ground plane 26. According to one aspect, antenna element 10 may be conformal with the ground plane 26.

With continued reference to FIGS. 1-8, but particular reference to FIGS. 1-4, a first embodiment of antenna element 10 will now be discussed as antenna element 10A. At its most basic, antenna element 10A may utilize first and second element ports 12 and 14 as orthogonally arranged slot elements to provide an omni-directional vertical polarization (V-pol) radiation pattern and a horizontal polarization (H-pol) radiation pattern fed by a ridged waveguide magic-t feed 16 featuring improved bandwidth, H-pol performance, and power handling while reducing loss and allowing for both standard and additive manufacturing techniques, as discussed further below.

In addition to the elements listed above, first embodiment 10A of antenna element 10 may further include an air cavity 28 and a pair of microstrip boards 30 with a first microstrip board 32 associated with the Δ port 18 and a second microstrip board 34 associated with the Σ port 20, as discussed further below. First embodiment 10A of antenna element 10 may further include parallel plate pairs on each of first and second element ports 12 and 14 with a first parallel plate pair 36 associated with first element port 12 and a second parallel plate pair 38 associated with second element port 14.

With reference to FIGS. 1-4, first element port 12 and second element port 14 may be standard chevron slot elements defined and arranged orthogonally relative to each other in slot plate 22 such that first element port 12 and second element port 14 may generally function as a 180-degree hybrid, which, in combination with the waveguide magic-t feed 16, Δ port 18, and Σ port 20, may constitute a 180-degree four port hybrid, as discussed further herein. The waveguide magic-t feed 16 will be discussed in further detail below.

Slot plate 22 may be a standard slot plate having a first slot 40 corresponding to first element port 12 and a second slot 42 corresponding to second element port 14 of antenna element 10A defined therein. Slot plate 22 may be formed of any suitable material, such as brass or other such conductive material. According to another aspect, slot plate 22 may be formed of non-conductive material having additional conductive components operably connected thereto, as desired.

First and second slots 40 and 42 may be defined through the thickness of slot plate 22 and may be generally chevron-shaped having ends 44 that are wider than a middle portion 46 thereof. First and second slots 40 and 42 may be substantially identical but for their placement and orientation in slot plate 22.

Radome 24 may be a protective covering that fits over slot plate 22 and may be formed of any suitable radome material according to the desire implementation. According to one example, radome may be constructed of a radio frequency (RF) transparent material. According to another aspect, radome may be constructed of a material suitable for use to further enhance the transmission and/or reception of an RF signal, as desired or dictated by the desired implementation. According to one non-limiting example, radome 24 may be formed from Stycast epoxy, which may be commercially available from Loctite, or from other similar epoxy materials. According to another example, radome may be any suitable coating including materials with electromagnetic shielding properties as desired.

Radome 24 may further include a first slot projection 48 and a second slot projection 50 corresponding to first and second slots 40 and 42. First and second slot projections 48 and 50 may be sized, shaped, and oriented to fit in and otherwise fill the first and second slots 40 and 42 defined through slot plate 22.

Ground plane 26 may be any suitable material such as aluminum or other metals and may be representative of a larger structure in which antenna element 10 may be installed. According to one non-limiting example, ground plane 26 may be a portion of, or operably connected to, the skin or an aircraft or other similar vehicle. Ground plane 26 may generally have an upper or outer surface which may be the surface opposite the waveguide magic-t feed 16 and other components of antenna element 10. In the example wherein the ground plane 26 is the skin of an aircraft or other vehicle, this upper or outer surface may be the outer surface of the vehicle with the remaining components of antenna element 10 located inside the skin of the vehicle and behind the ground plane 26. According to one aspect, as best seen in FIG. 1, the outermost surface of radome 24 may be substantially planar with the outermost surface of ground plane 26.

Air cavity 28 may be an open space bounded and defined by a structure shown and referred to herein as cup 52. Cup 52 may have a base 54 with first and second slot apertures 56 and 58 defined therein to allow first and second element ports 12 and 14 to extend therethrough and into the cavity 28. Cup 52 may further include a sidewall 60, which may be continuous about the perimeter of cup 52 and may further bound the open area that defines the air cavity 28. (This open air cavity 28 is best seen in the cross section view of FIG. 8.). Cup 52 may be formed of any suitable material and may be conductive or non-conductive according to the desired implementation and the specific operational perimeters thereof.

Microstrip boards 30, including first microstrip 32 and second microstrip 34, may be standard microstrip probe boards including a dielectric substrate and a conductive microstrip formed thereon. As mentioned above, first microstrip 32 may be an H-pol microstrip and may be operably connected to the A port 18 and may serve as a direct microstrip feed for the Δ port 18. Similarly, second microstrip 34 may be a V-pol microstrip operably connected to the Σ port 20 to serve as a direct microstrip feed thereto. First and second microstrip boards 32 and 34 will be understood to include any suitable or necessary components as dictated by the desired implementation.

First and second port parallel plate pairs 36 and 38 (best seen in FIGS. 3-4) may be formed of any suitable conductive material such as copper, gold, or the like and may be printed or otherwise overlaid on the ends of first and second element ports 12 and 14 to facilitate electrical conduction between the waveguide magic-t feed 16 and element ports 12 and 14, as discussed further below. Parallel plate pairs 36 and 38 may have a first end 62 opposite a second end 64 with first end 62 being generally thicker than second end 64 to provide a suitable contact interface between parallel plate pairs 36 and 38 and slot plate 22, as discussed further below.

Figure 4:
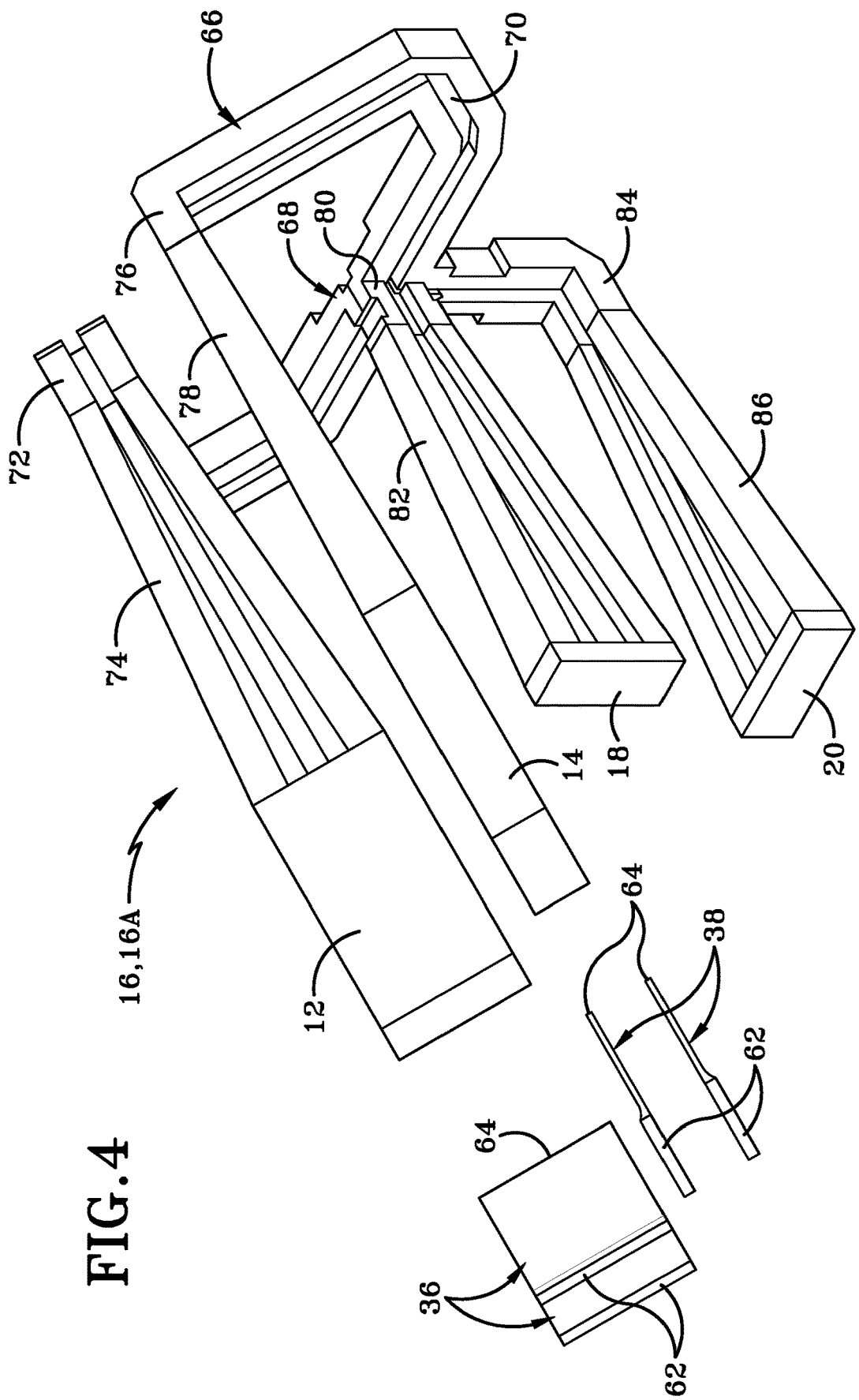
FIG. 4 is a side exploded diagrammatic view of the ridged waveguide magic tee (magic-t) from the first embodiment of FIG. 1, according to one aspect of the present disclosure.
Figure 5:
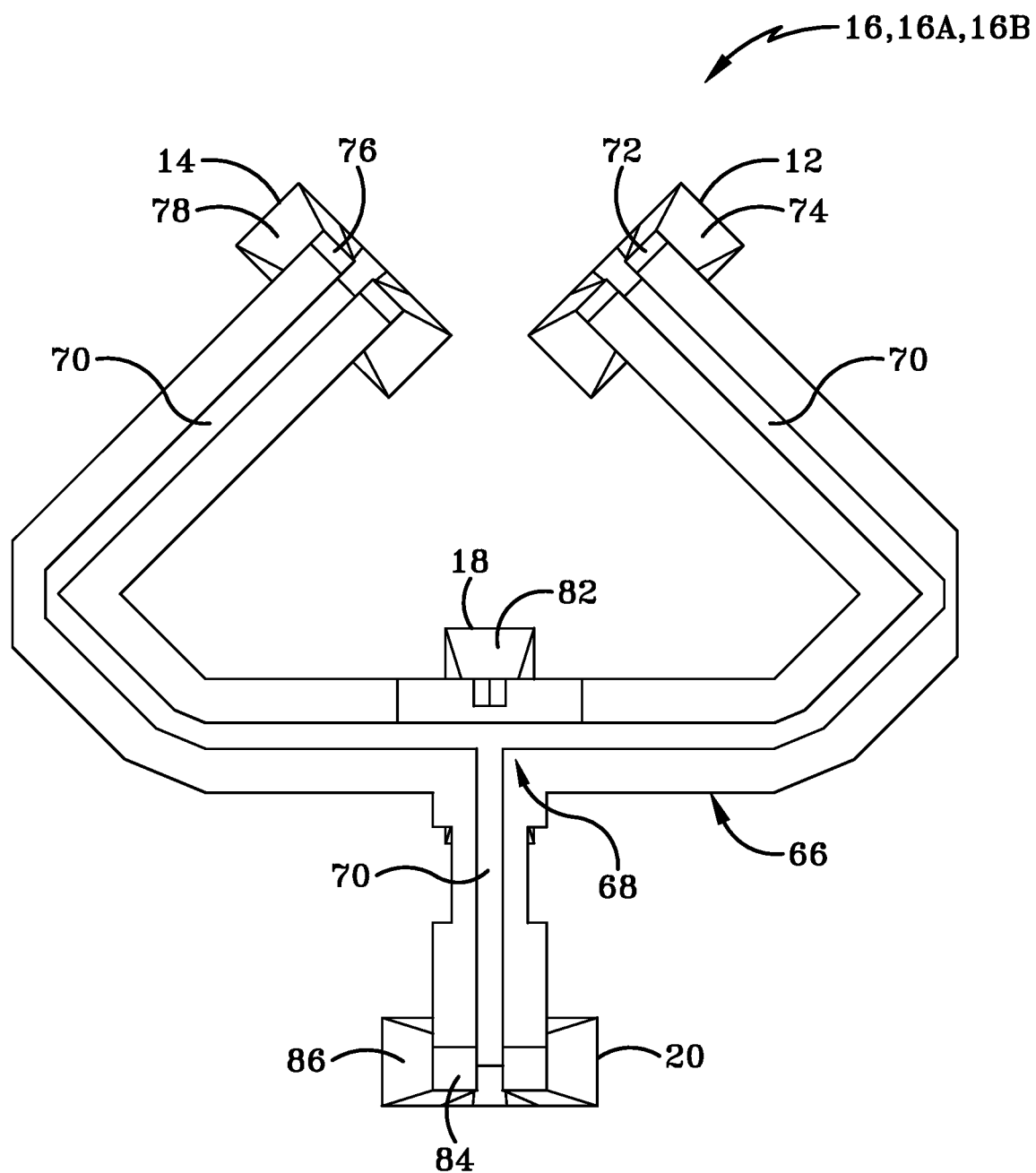
FIG. 5 is a bottom elevation view of the ridged waveguide magic-t, of FIG. 4, according to one aspect of the present disclosure.
Figure 11:
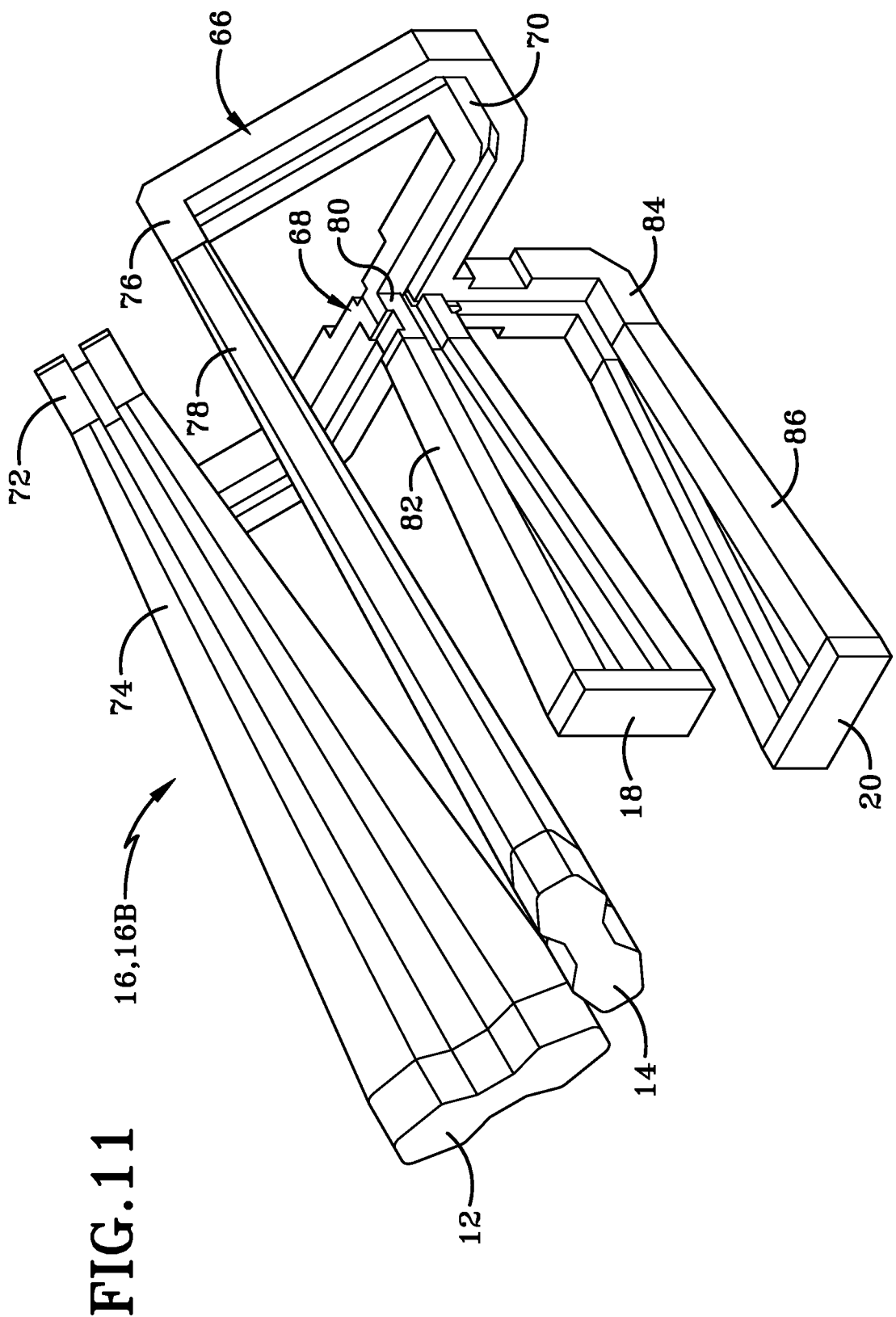
FIG. 11 is a side elevation diagrammatic view of a ridged waveguide magic-t of the second embodiment, according to one aspect of the present disclosure.

With reference now to FIGS. 4 and 5 the waveguide magic-t feed 16 will now be discussed in more detail. In particular, FIGS. 4 and 5 show a first embodiment of magic-t feed 16 referenced at 16A. A second embodiment 16B of magic-t feed is shown in FIG. 11 (and FIG. 5 in part) and is discussed further below with second embodiment 10B of antenna element 10.

Magic-t feed 16 may be a standard waveguide feed which, as mentioned above, may further provide a four-port 180-degree hybrid feed having first element port 12, second element port 14, Δ port 18, and Σ port 20. Magic-t feed 16 may include a body 66 with four total feed transitions extending out from a feed network junction 68. This feed network junction 68 may be representative of the point in magic-t feed 16 where the various sections of magic-t feed 16 intersect. Body 66 of magic-t feed 16 may further include one or more channels 70 defined therein to allow any associated wiring or other similar components to be affixed or otherwise connected thereto.

As mentioned above, magic-t feed 16 may have four individual feeds, namely, a first element feed 72 which may further include a first port transition section 74, a second element feed 76 with second port transition 78, a third (Δ) element feed 80 having a third (Δ) port transition section 82, and a fourth (Σ) element feed 84 and fourth (Σ) port transition section 86. These transition sections 74, 78, 82 and 86 may generally be defined as the regions wherein body 66 of magic-t feed 16 expands out from the feed network junction to fully feed each of first and second element ports 12 and 14, Δ port 18, and Σ port 20 respectively. It is these four transition sections 74, 78, 82, and 86 that permit the functionality of the waveguide magic-t feed 16 to operate as a four-port 180-degree hybrid with the transitional sections 74, 78, 82, and 86 further allowing the waveguide magic-t feed 16 to transition to a traditional waveguide at the first and second element feeds 72 and 76.

Magic-t feed 16 may, other than the particular shape and form, operate according to standard waveguide operations, as discussed further below, and may accordingly include any suitable wiring or other hardware or components as necessary for normal operation of magic-t feed 16.

As discussed above, the waveguide magic-t feed 16 may be constructed utilizing standard metal and polymer production techniques but may alternatively be constructed utilizing additive manufacturing such as 3D printing, which may allow further customization and scalability to the ridged waveguide magic-t and may further allow the specific form to be modified slightly for use in legacy systems and/or for use across different operational environments. For example, magic-t feed 16 may be quickly manufactured utilizing additive manufacturing to fit a first type of aircraft or vehicle while simultaneously being manufactured or modified to fit a second type of aircraft or vehicle, as dictated by the desired implementation.

Having thus described the general elements and components of first embodiment 10A of antenna element 10, the construction and configuration thereof will now be discussed.

Figure 2:
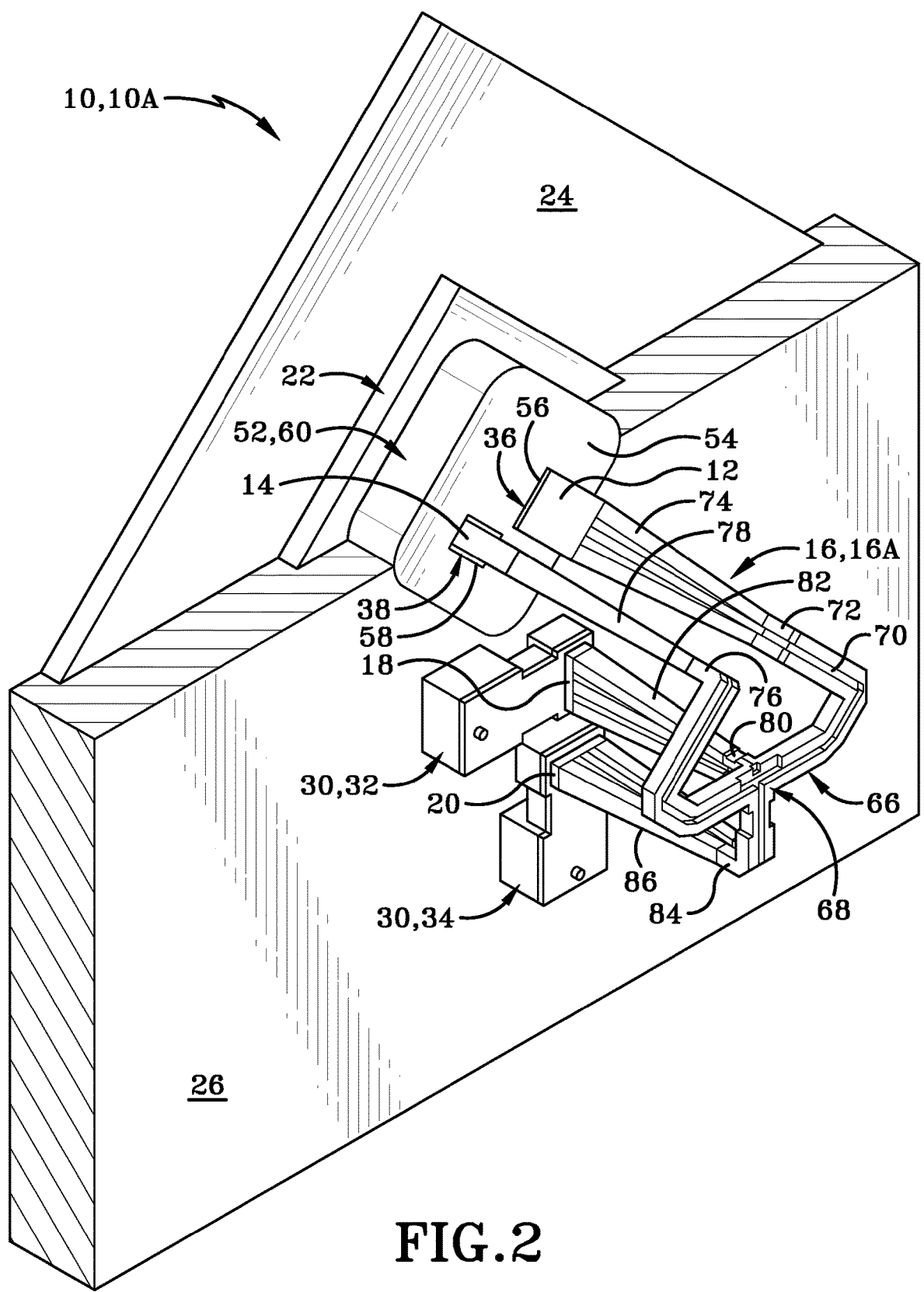
FIG. 2 is a rear isometric partial cutaway view of the first embodiment of the antenna element from FIG. 1, according to one aspect of the present disclosure.
Figure 3:
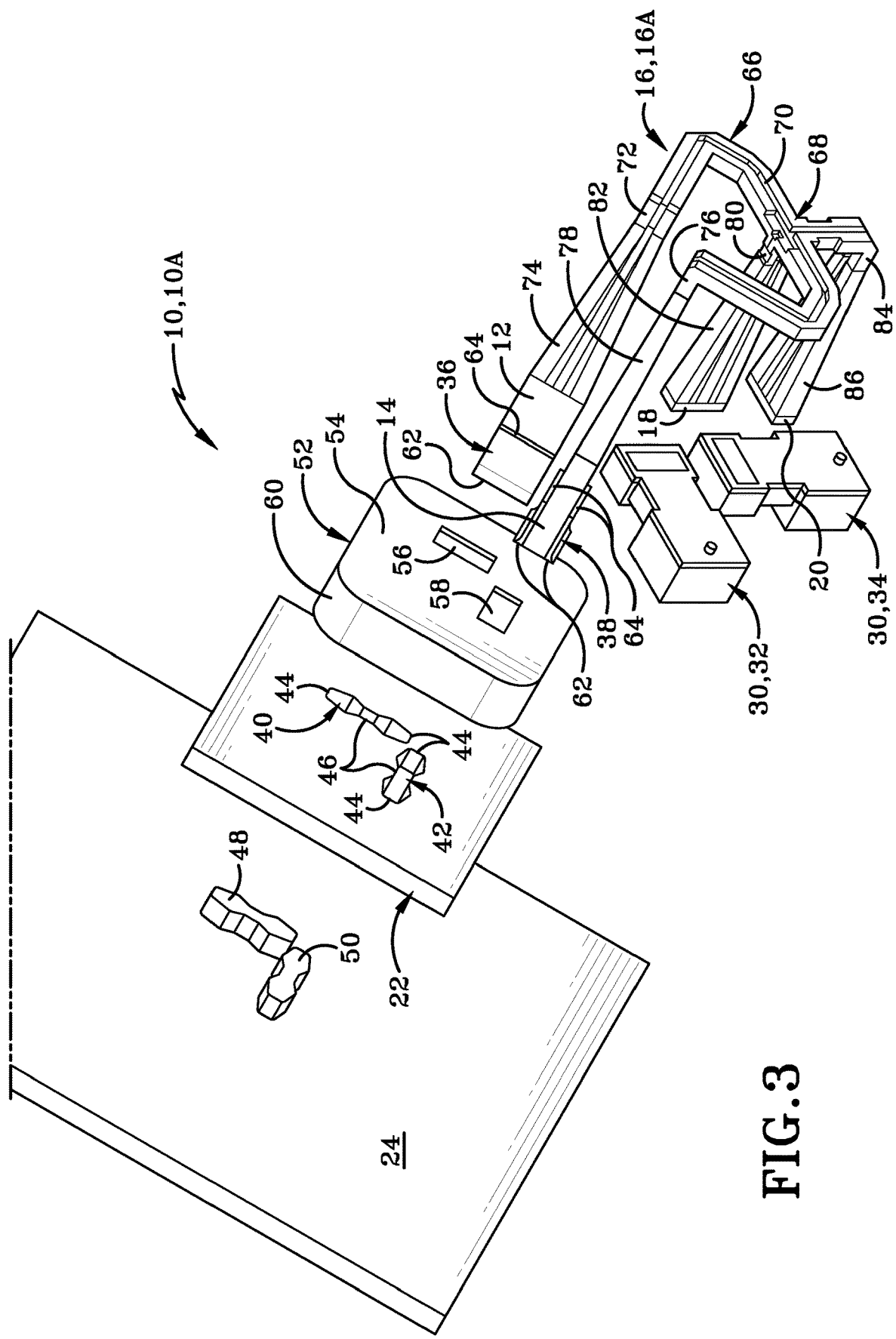
FIG. 3 is a rear exploded view of the first embodiment from FIG. 1, according to one aspect of the present disclosure.

With reference to FIGS. 2 and 3, first embodiment 10A of antenna element 10 may be constructed such that ground plane 26 may be the uppermost or outermost layer of antenna element 10A with radome 24 embedded therein. As mentioned above, first slot projection 48 and second slot projection 50 of radome 24 may extend into first and second slots 40 and 42 of slot plate 22, which may function to secure radome 24 to slot plate 22 while further providing a connection or termination for first and second element ports 12 and 14. Accordingly, slot plate 22 may therefore be below or otherwise adjacent to radome 24 and may be further embedded in ground plane 26 or below and/or behind an outer surface thereof.

Cup 52 may be affixed to the side of slot plate 22 that is opposite radome 24 with the sidewall 60 contacting the slot plate 22 to fully enclose the air cavity 28 through which first and second element ports 12 and 14 may extend. Cup 52 may be secured to slot plate through any suitable means, including, but not limited to, adhesive, welding, or other suitable mechanical fastening methods. Alternatively, cup 52 may be abutting the slot plate 22 but not secured thereto.

Accordingly, first and second element ports 12 and 14, first port parallel plate pair 36, and second port parallel plate pair 38, as well as at least a portion of first and second element feeds 72 and 76 of magic-t feed 16 may be extended through the first and second cup apertures 56 and 58 and into air cavity 28. First element port 12 and second element port 14 may contact the bottom of slot plate 22 and the first and second slot projections 48 and 50 extending through first and second slots 40 and 42 thereof, respectively.

First and second parallel plate pairs 36 and 38 may likewise extend into and through air cavity 28, with the first ends 62 thereof in contact with the slot plate 22. As discussed herein, the parallel plate pairs 36 and 38 may have a slightly thicker first end 62 than second end 64 to provide more surface area for better contact with slot plate 22. Plate pairs 36 and 38 may taper in thickness from the second ends 64 to the first ends 62, as depicted in the figures. Alternatively, parallel plate pairs 36 and 38 may have any suitable thickness and/or configuration to provide the connection to slot plate 22. For example, plate pairs 36 and 38 can be "L" shaped, or may have any other suitable profile shape. According to another example, parallel plate pairs 36 and 38 may be additively applied to first and second element ports 12 and 14 after engaging the element ports 12 and 14 with the slot plate 22. In this example, parallel plate pairs 36 and 38 may then be added with the first ends 62 thereof "bleeding" onto slot plate 22 in the additive process.

Difference Δ and sum Σ ports 18 and 20 may extend from body 66 of magic-t feed 16 terminating with ports 18 and 20 connecting to first and second microstrip boards 32 and 34, respectively. First and second microstrip boards 32 and 34 may be supported on, or otherwise connected to, a bottom surface of ground plane 26, which may simply be the surface opposite the upper or outer surface of ground plane 26, as discussed above.

Figure 6:
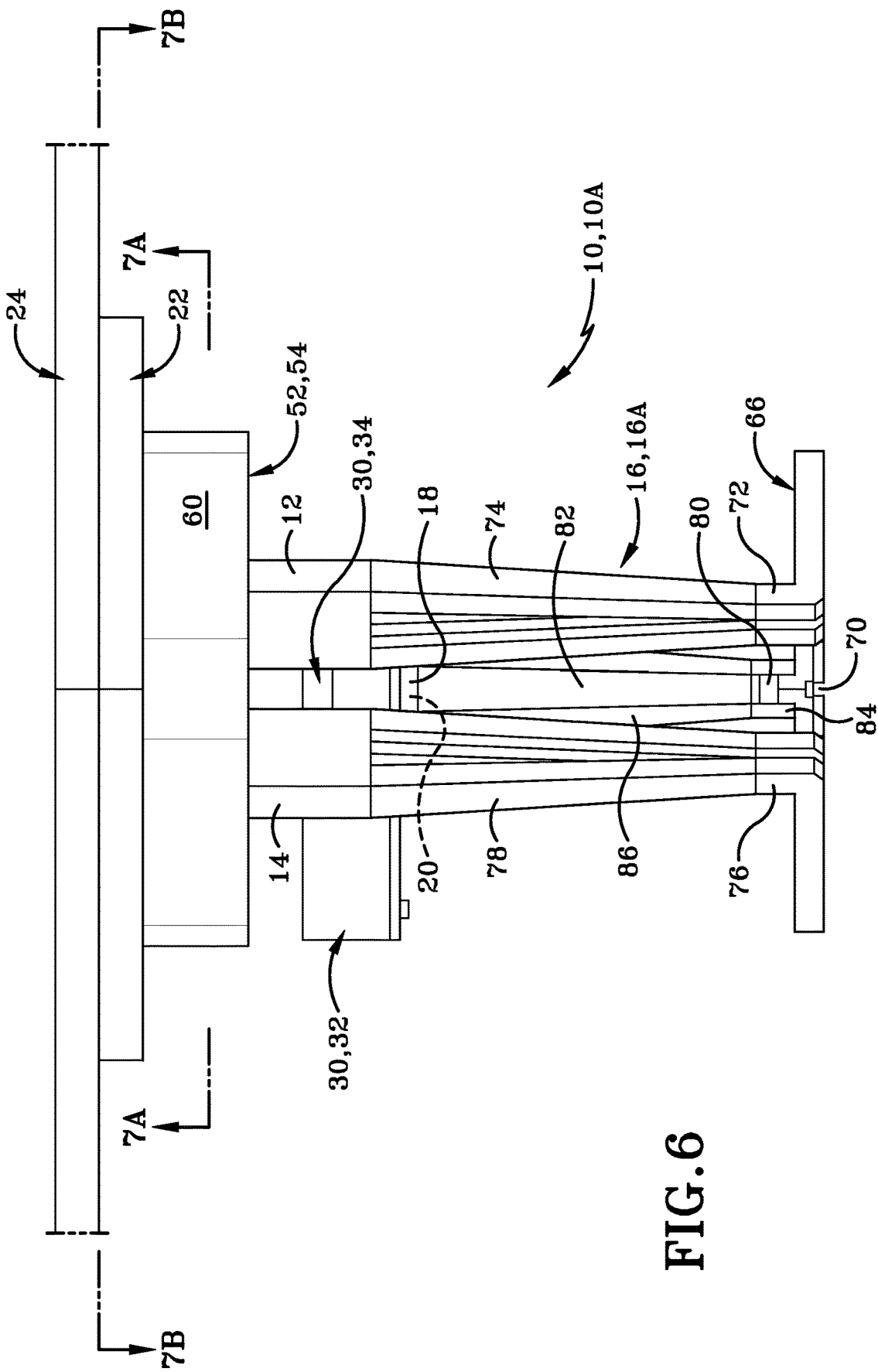
FIG. 6 is a side elevation view of the first embodiment from FIG. 1, according to one aspect of the present disclosure.
Figure 7A:
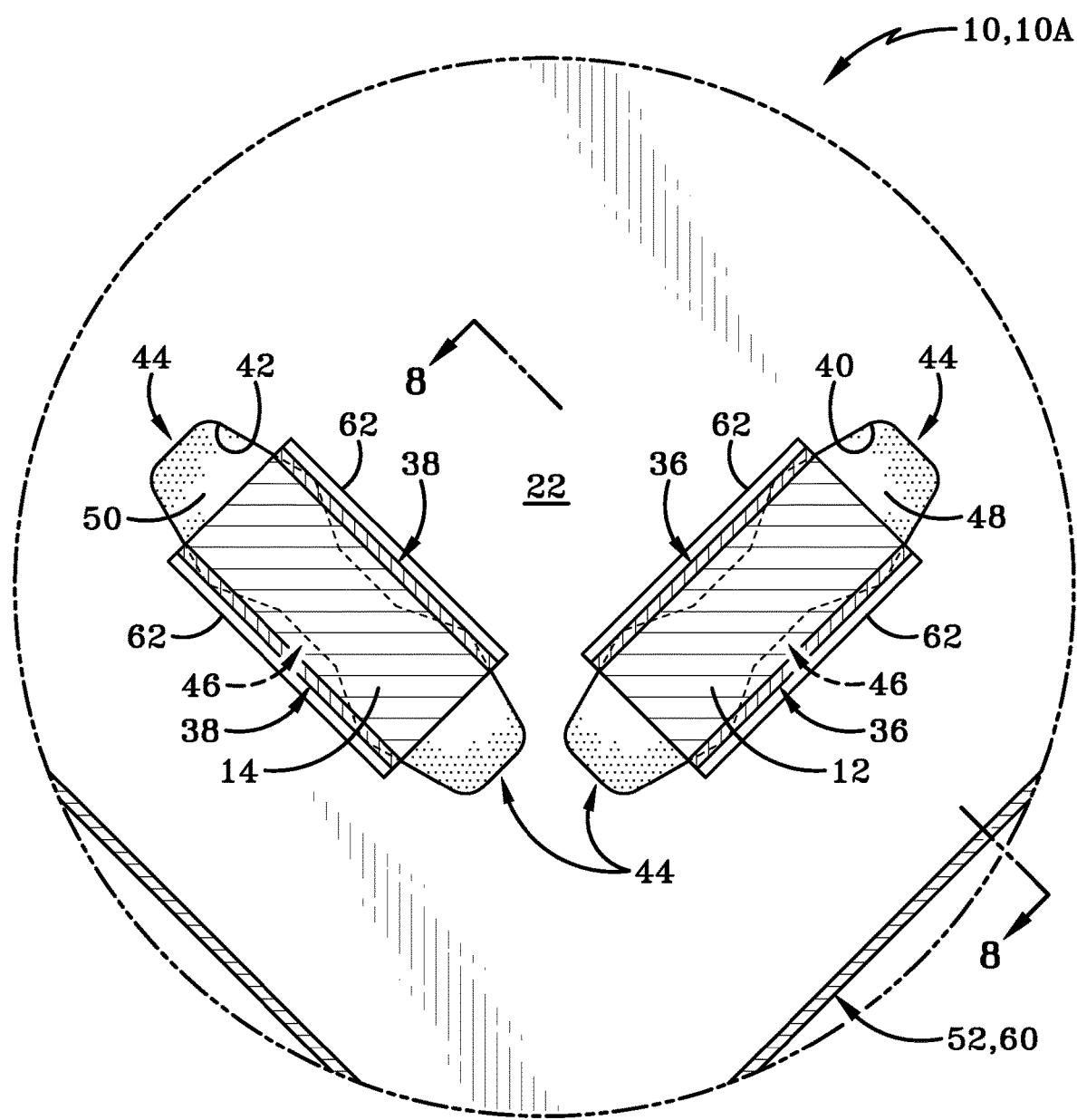
FIG. 7A is a close-up partial cross sectional view of the first embodiment looking in the direction of the arrows indicated in FIG. 6, according to one aspect of the present disclosure.
Figure 7B:
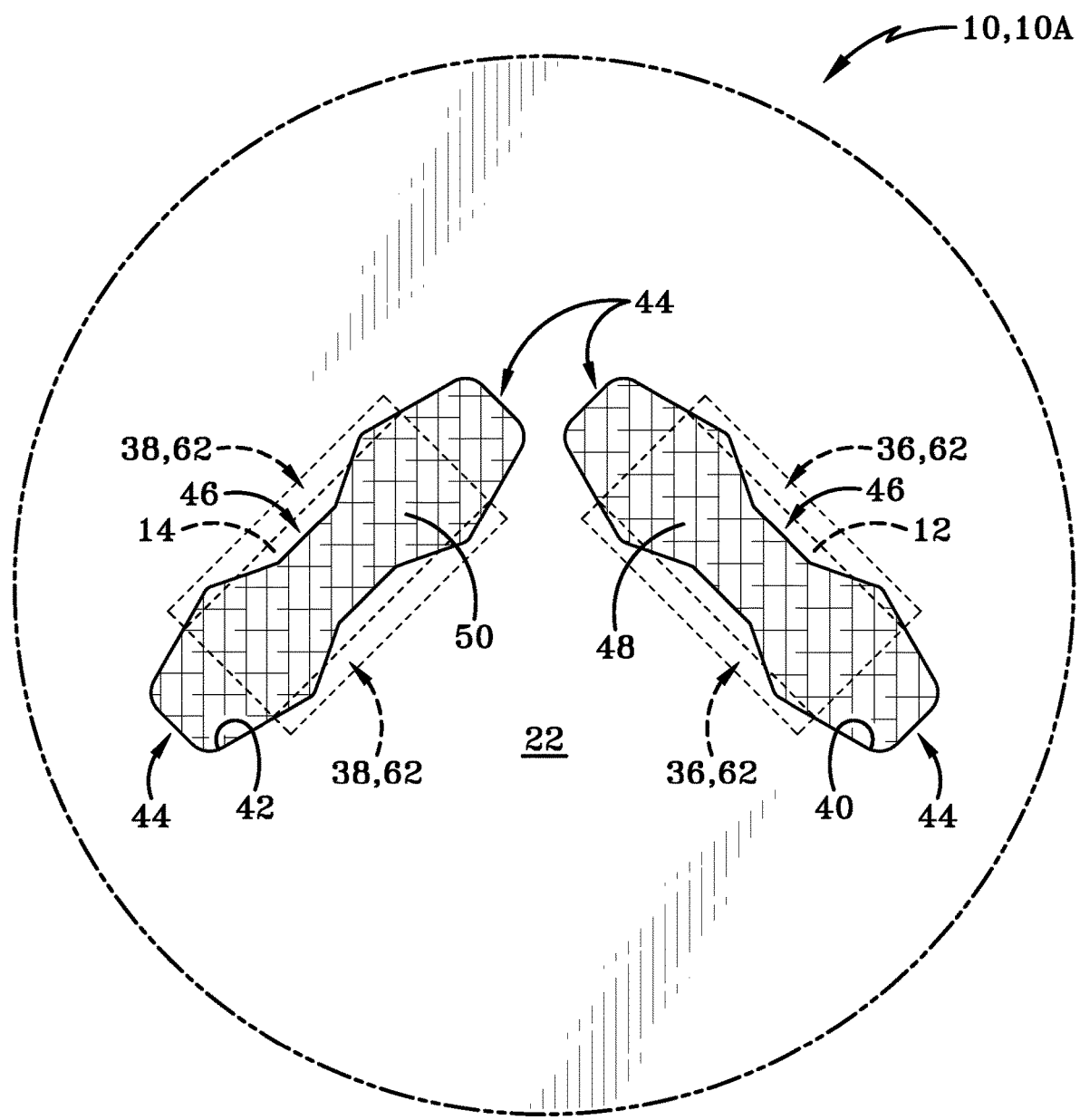
FIG. 7B is a close-up partial cross sectional view of the first embodiment looking in the direction of the arrows indicated in FIG. 6, according to one aspect of the present disclosure.
Figure 8:
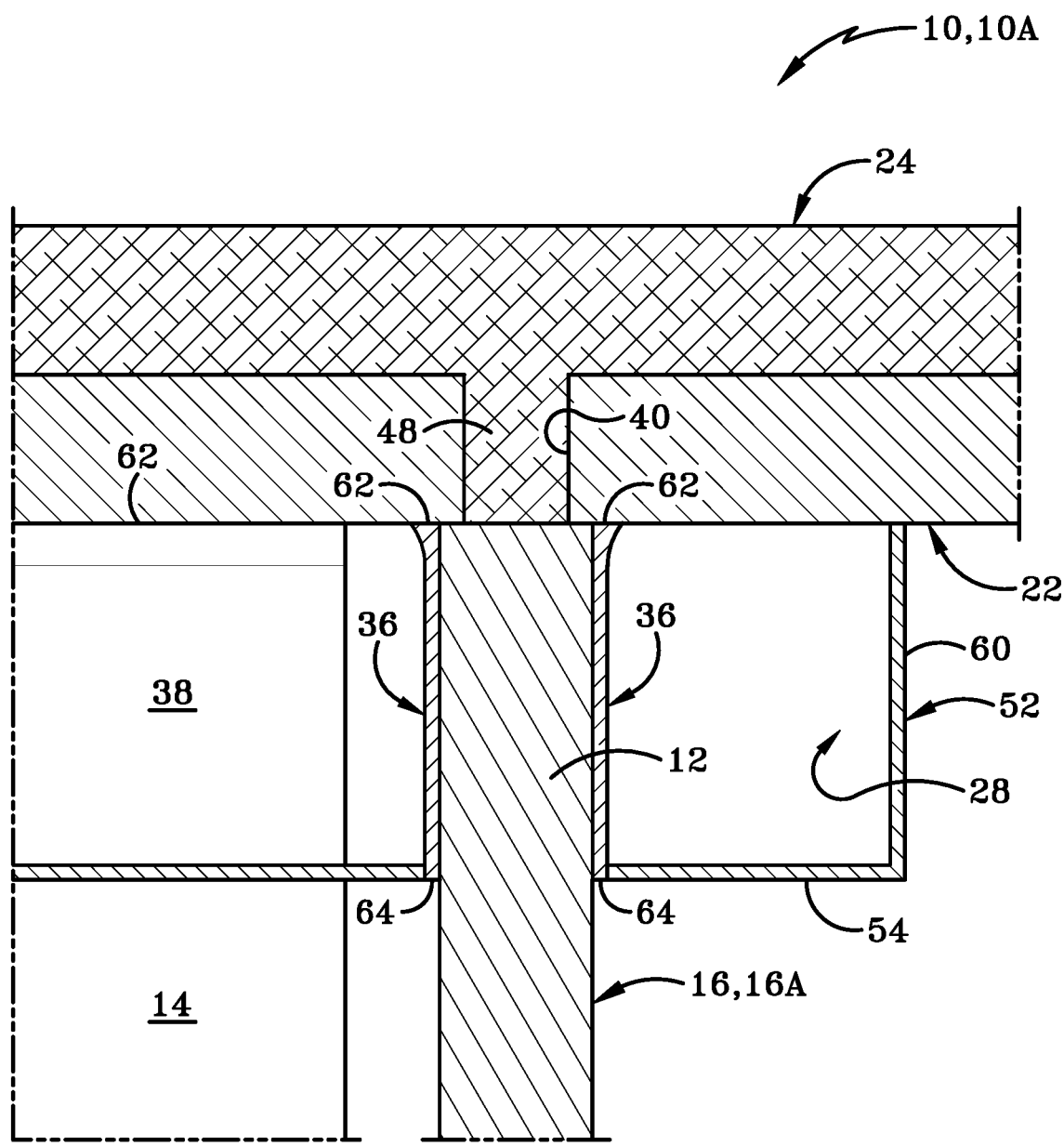
FIG. 8 is a side elevation cross sectional view of the first embodiment looking in the direction of the arrows indicated in FIG. 7A, according to one aspect of the present disclosure.
Figure 9:
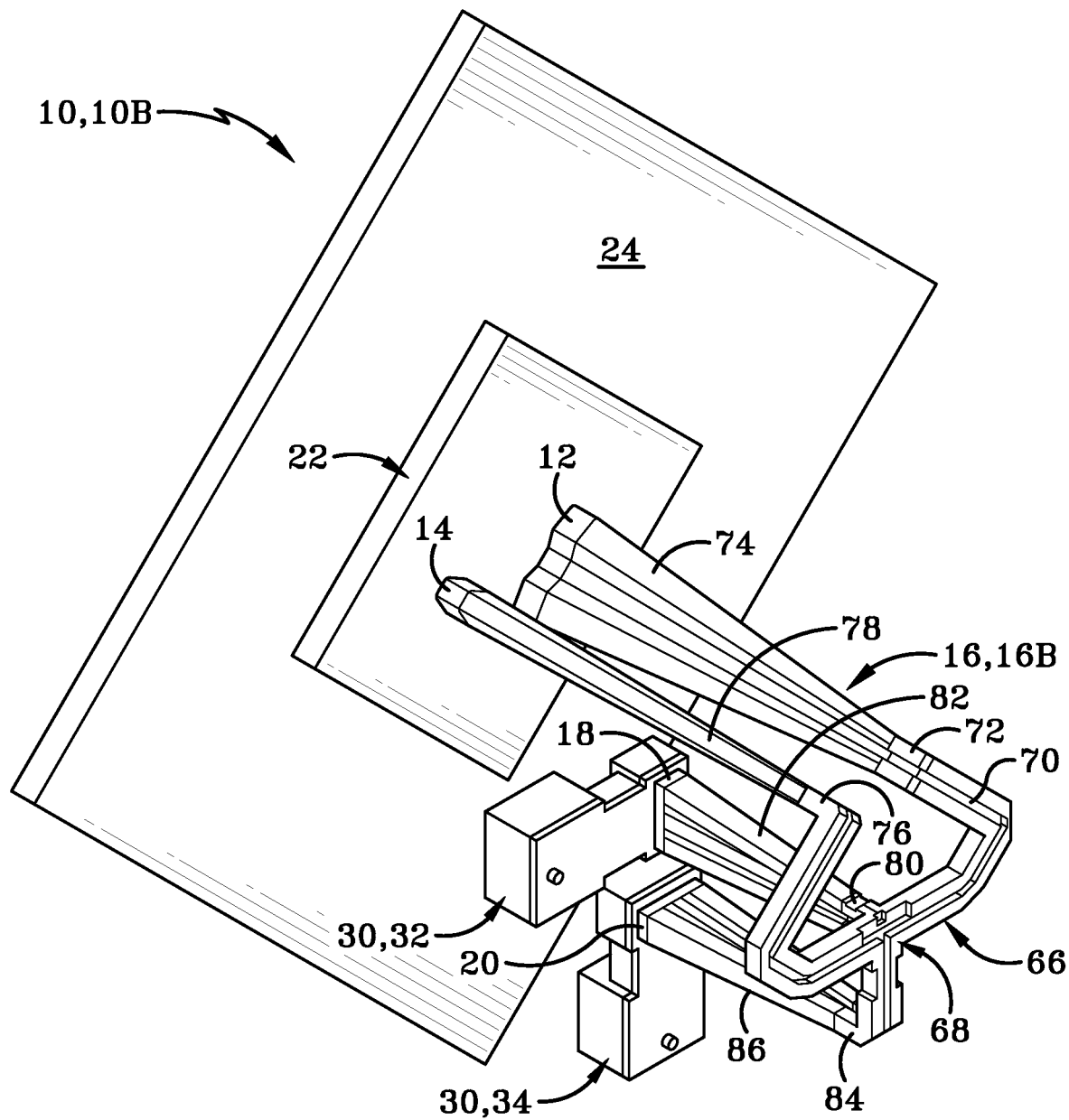
FIG. 9 is a rear isometric partial cutaway view of a second embodiment of the antenna element from FIG. 1, according to one aspect of the present disclosure.
Figure 10:
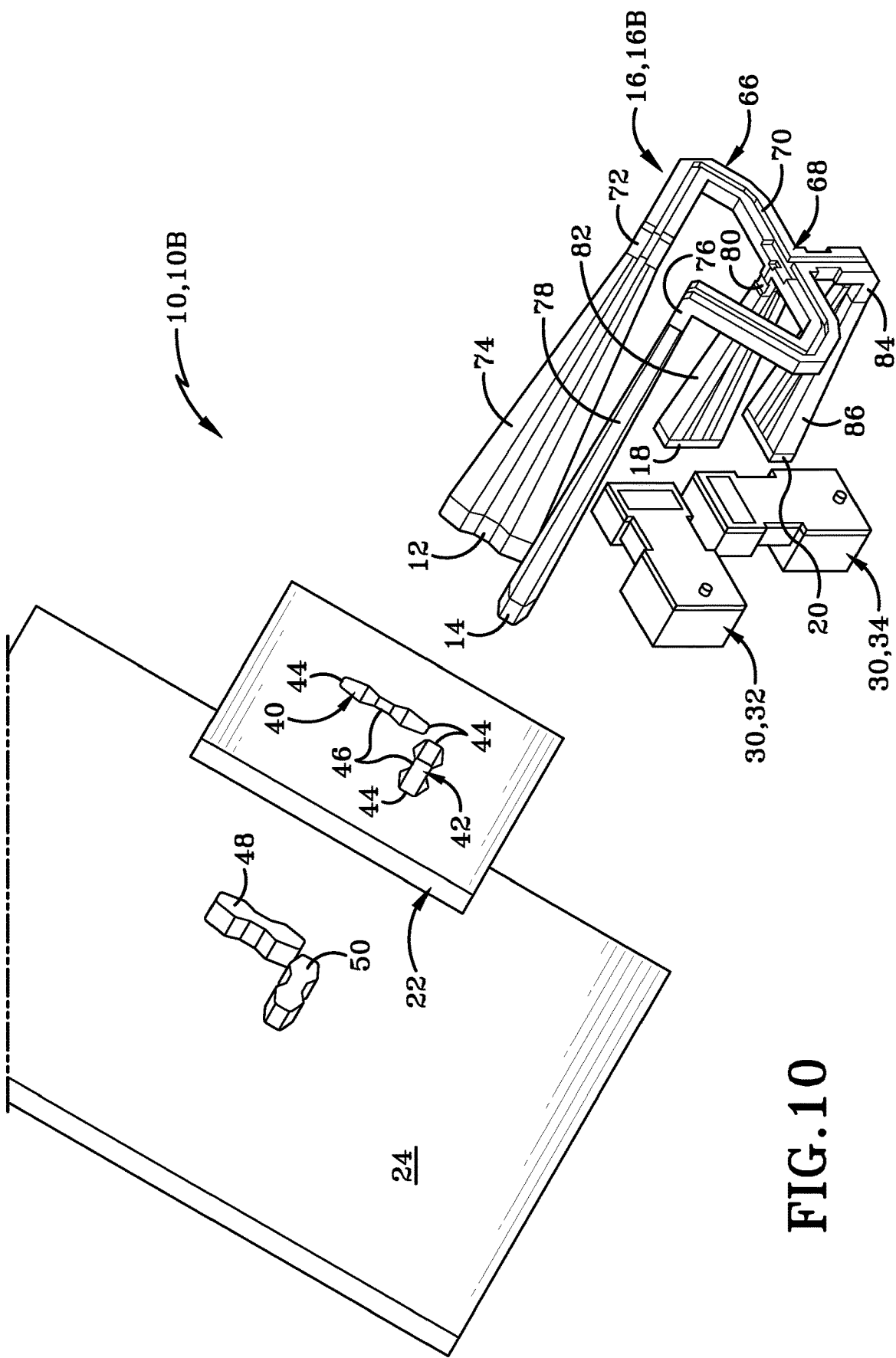
FIG. 10 is a rear exploded view of the second embodiment from FIG. 9, according to one aspect of the present disclosure.

With further reference to FIGS. 6-8, first embodiment 10A of antenna element 10 may be "stacked" such that the components may build upon each other in a manner, such as depicted in FIG. 6. For clarity, ground plane 26 has been removed from FIG. 6 showing the different layers of antenna element 10 and their relative position. As mentioned above, and as better seen in FIGS. 7A and 7B, first and second slot projections 48 and 50 may fill substantially the entire openings of first and second slots 40 and 42 defined through slot plate 22 because of the chevron shape, with ends 44 being substantially wider than middle portion 46 of first and second slot 42 (and first and second slot projections 48 and 50, accordingly). The generally rectangular shape of first and second element ports 12 and 14 may provide some overlap with slot plate 22 while further providing a complete electrical connection with first and second port parallel plate pairs 36 and 38 with slot plate 22.

With reference to FIG. 8, as discussed above, the first end of plate pairs 62 may be slightly thicker than the second end 64 of plate pairs 36 and 38 to provide a larger contact surface with slot plate 22.

With reference now to FIGS. 9-14, a second embodiment of antenna element 10 is shown and generally indicated as antenna element 10B. Second embodiment 10B of antenna element 10 may be substantially similar to the first embodiment 10A in that second embodiment 10B may likewise include first and second element ports 12 and 14, magic-t feed 16, Δ port 18, Σ port 20, slot plate 22, radome 24, ground plane 26, and microstrip boards 30.

Second embodiment 10B may differ from first embodiment 10A in that second embodiment 10B may omit the air cavity 28 and the cup 52, as well as omitting the parallel plate pairs 36 and 38 from each port.

The waveguide magic-t feed 16B of the second embodiment 10B may differ from magic-t feed 16A of first embodiment 10A in that the second embodiment of magic-t 16B may still include port transition sections 74 and 78 of first element feed 72 and second element feed 76, respectively; however, these transition sections 74 and 78 may form a ridged waveguide that transitions directly to the slot plate 22 and slot elements (i.e. first and second slots 40 and 42). In utilizing this transitional shape in the waveguide magic-t feed 16B, antenna element 10B may eliminate the need for the air cavity 28 and parallel plates 36 and 38 to feed the slot elements. The transition sections 74 and 78 may be formed to provide the chevron shape at the element ports 12 and 14 to match first and second slots 40 and 42 of slot plate 22. As seen best in FIGS. 12-14, the first and second element ports 12 and 14 may then directly abut first and second slot projections 48 and 50 of radome 24 in first and second slots 42 and 48 and may contact the slot plate 22 and slot elements directly, without the need to incorporate the parallel plate pairs 36 and 38 of first embodiment 10A of antenna element 10.

As described further below, the ridged transition sections 74 and 78 of second embodiment 16B of magic-t 16 allow second embodiment 10B of antenna element 10 to maintain a super wideband functionality with a minimal impact on gain and other desired properties while further providing the additional benefits discussed herein.

Figure 12:
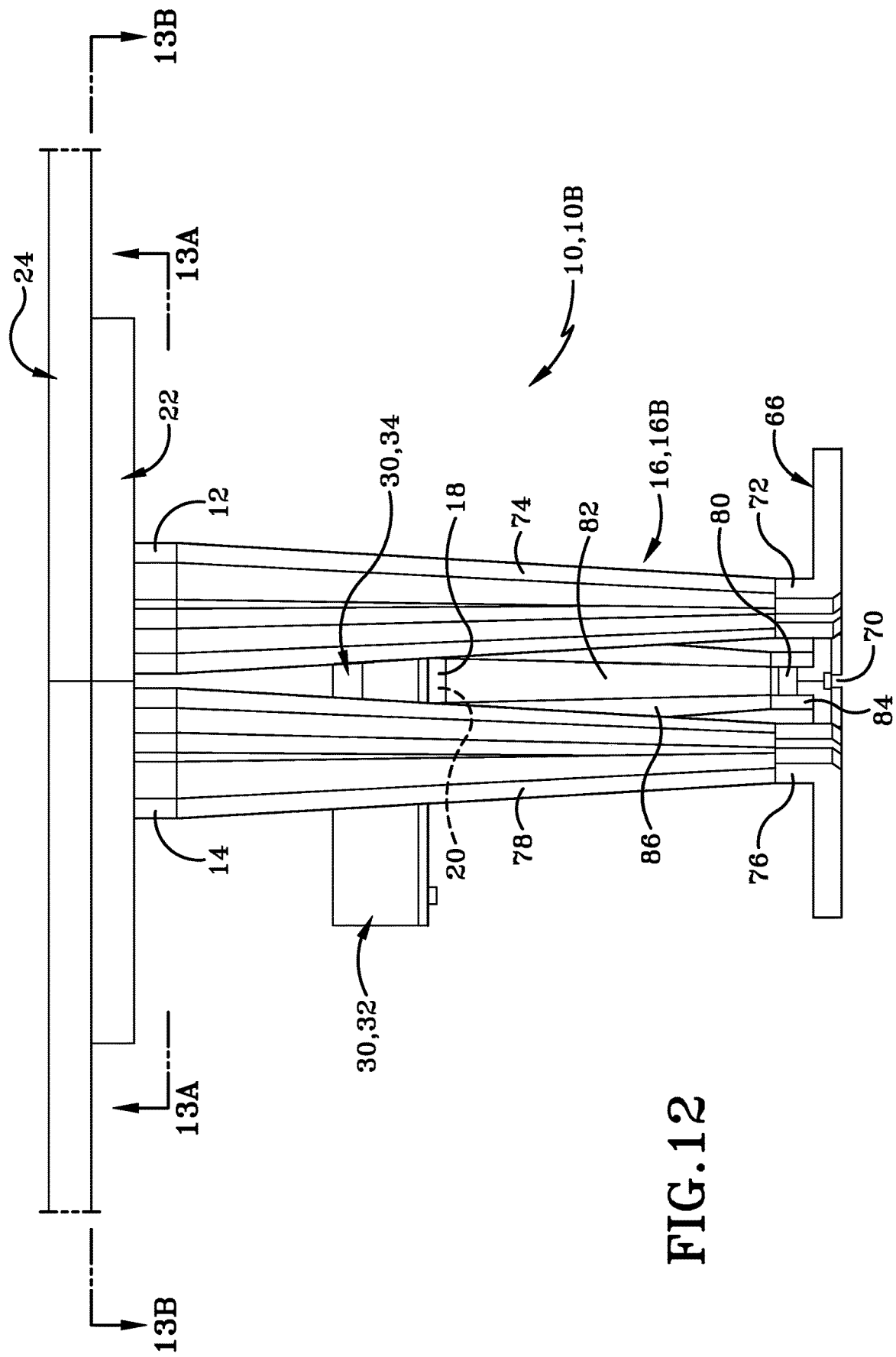
FIG. 12 is a side elevation view of the second embodiment, according to one aspect of the present disclosure.
Figure 13A:
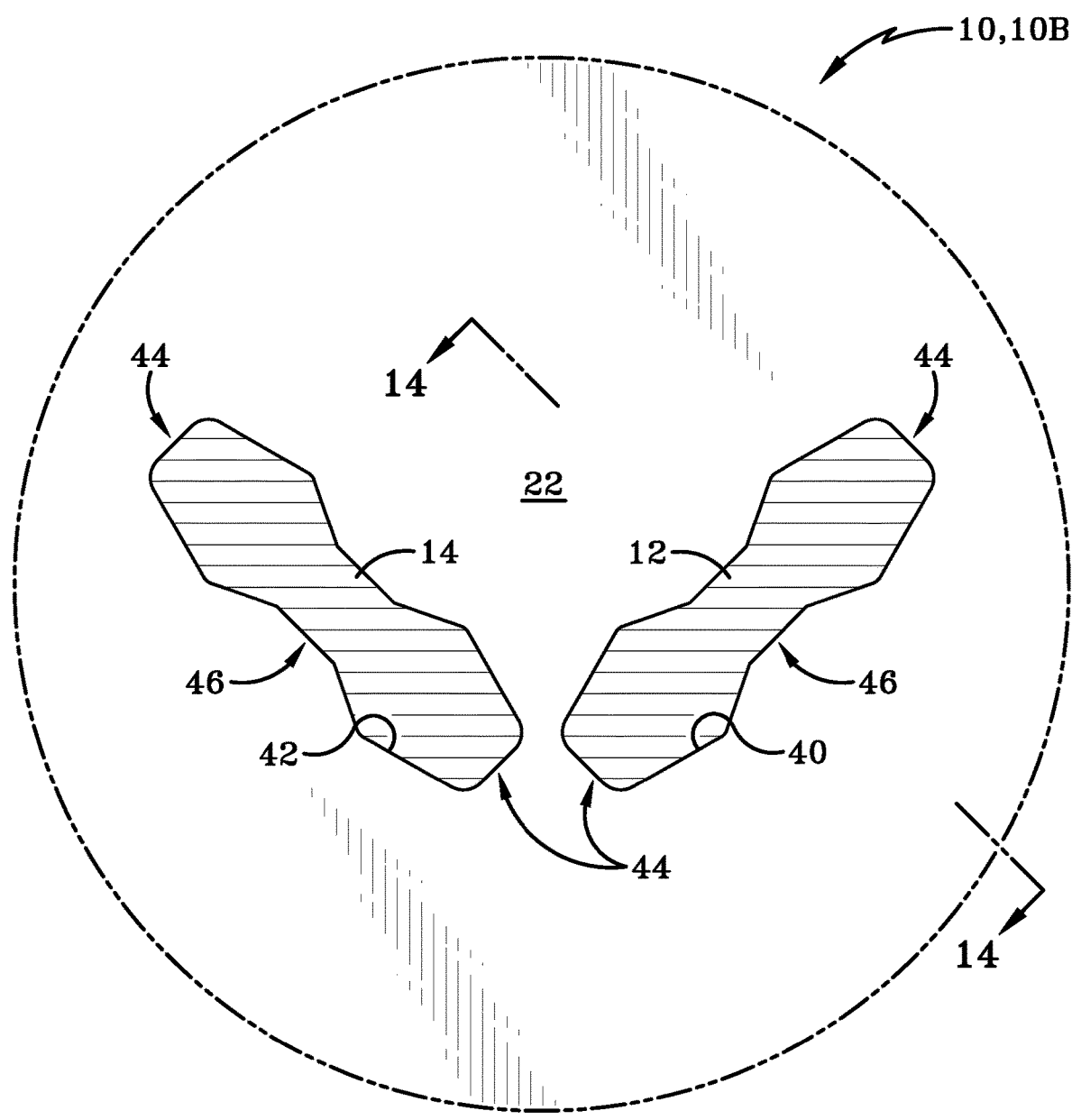
FIG. 13A is a close-up partial cross sectional view of the second embodiment looking in the direction of the arrows indicated in FIG. 12, according to one aspect of the present disclosure.
Figure 13B:
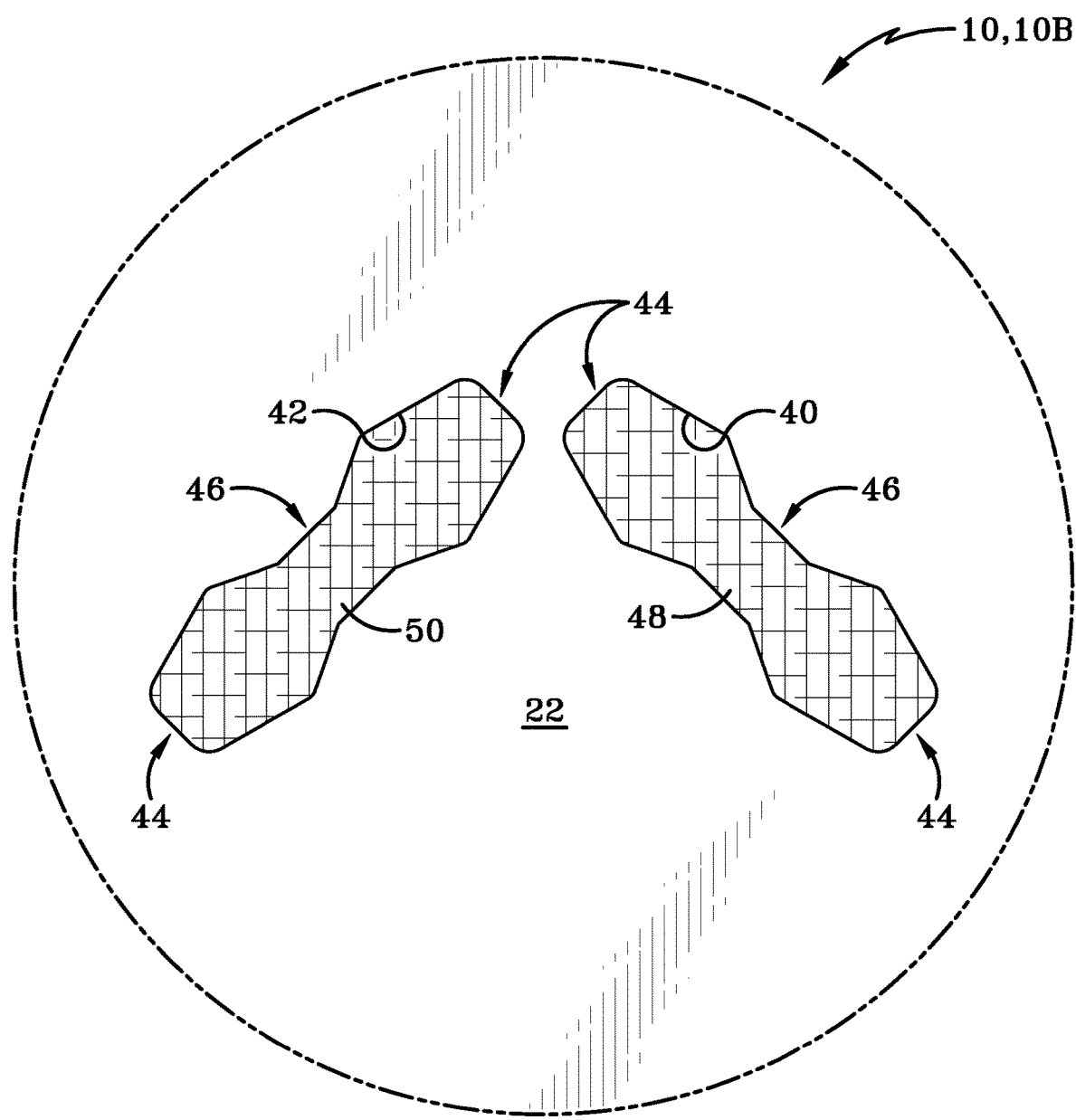
FIG. 13B is a close-up partial cross sectional view of the second embodiment looking in the direction of the arrows indicated in FIG. 12, according to one aspect of the present disclosure.
Figure 14:
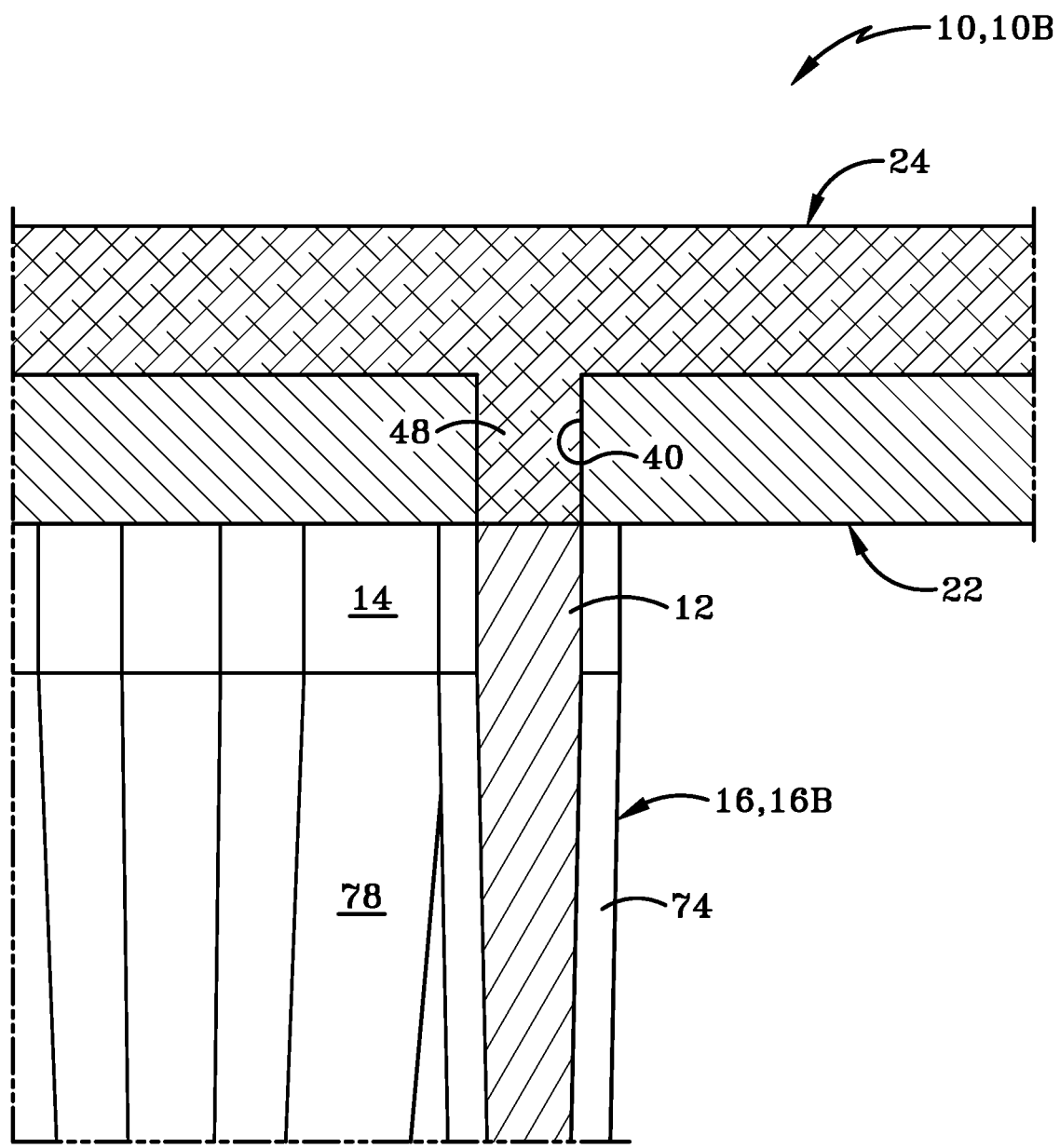
FIG. 14 is a side elevation cross sectional view of the second embodiment looking in the direction of the arrows indicated in FIG. 13A, according to one aspect of the present disclosure.

With reference to FIGS. 12 and 14, second embodiment 10B of antenna element 10 may be arranged in a layered configuration, similar to first embodiment 10A, as shown and as described above with reference to first embodiment 10A. The illustrated difference includes the elimination or omission of cup 52 and parallel plate pairs 36 and 38.

Having thus described the elements and components of antenna element 10, including first and second embodiments 10A and 10B thereof, the operation and use thereof will now be discussed. It will be understood that both embodiments 10A and 10B of antenna element 10 may operate in substantially similar ways. Accordingly, the operation of antenna element 10 will be discussed generally and will be understood to apply equally to both embodiments 10A and 10B, unless specifically stated otherwise. It is further contemplated that first and second embodiments 10A and 10B may be exchanged in operational systems, including legacy systems, with one main consideration being the cost vs gain of each embodiment. Put another way, first and second embodiments 10A and 10B are scalable and adaptable, and are therefore substantially interchangeable, for use in identical or substantially similar systems, including legacy systems, and may be chosen by the cost and gain requirements of any specific installation and application.

Figure 15A:
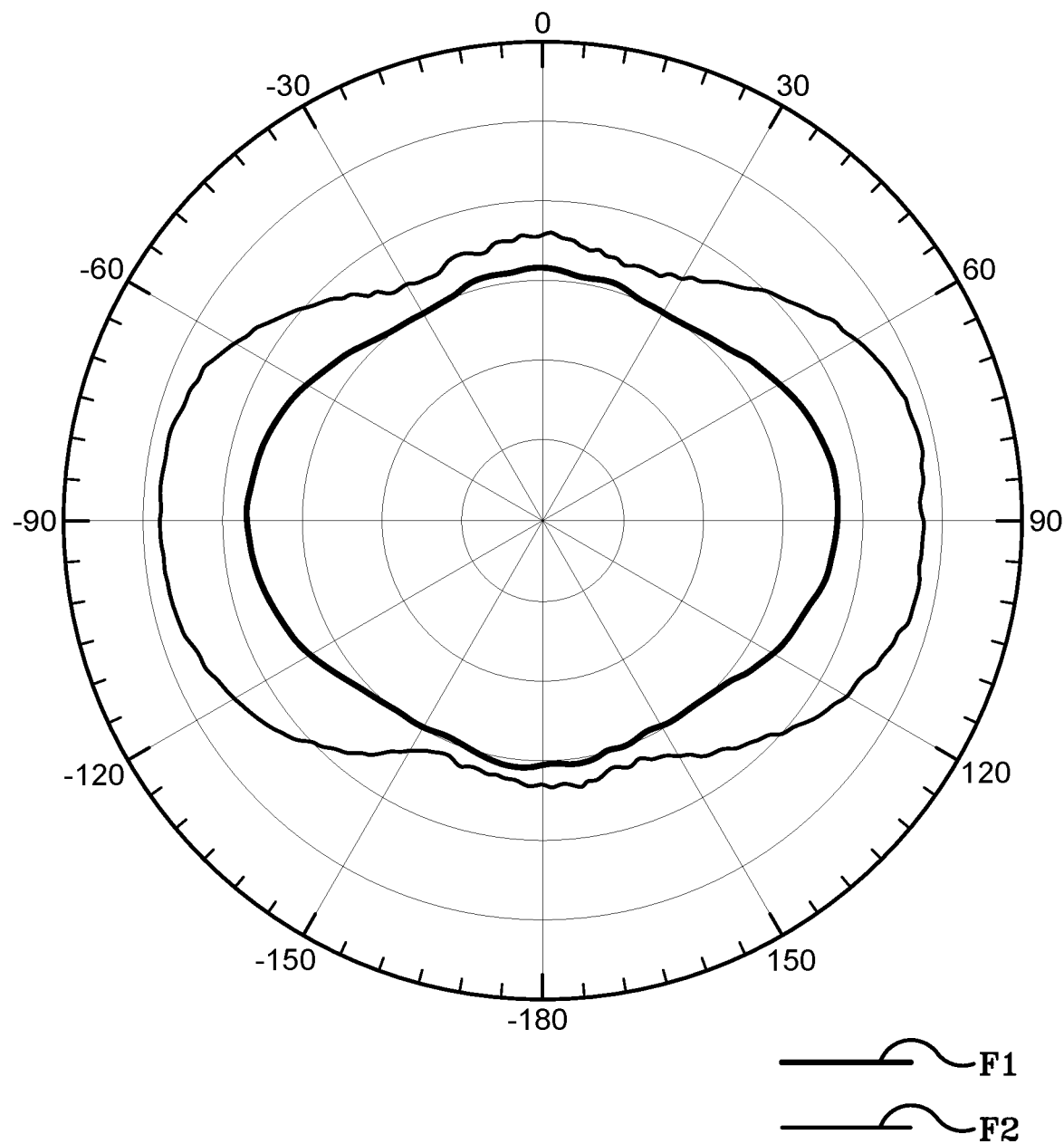
FIG. 15A is a graphical representation of a prior art co-polarized antenna element azimuth gain model.
Figure 15B:
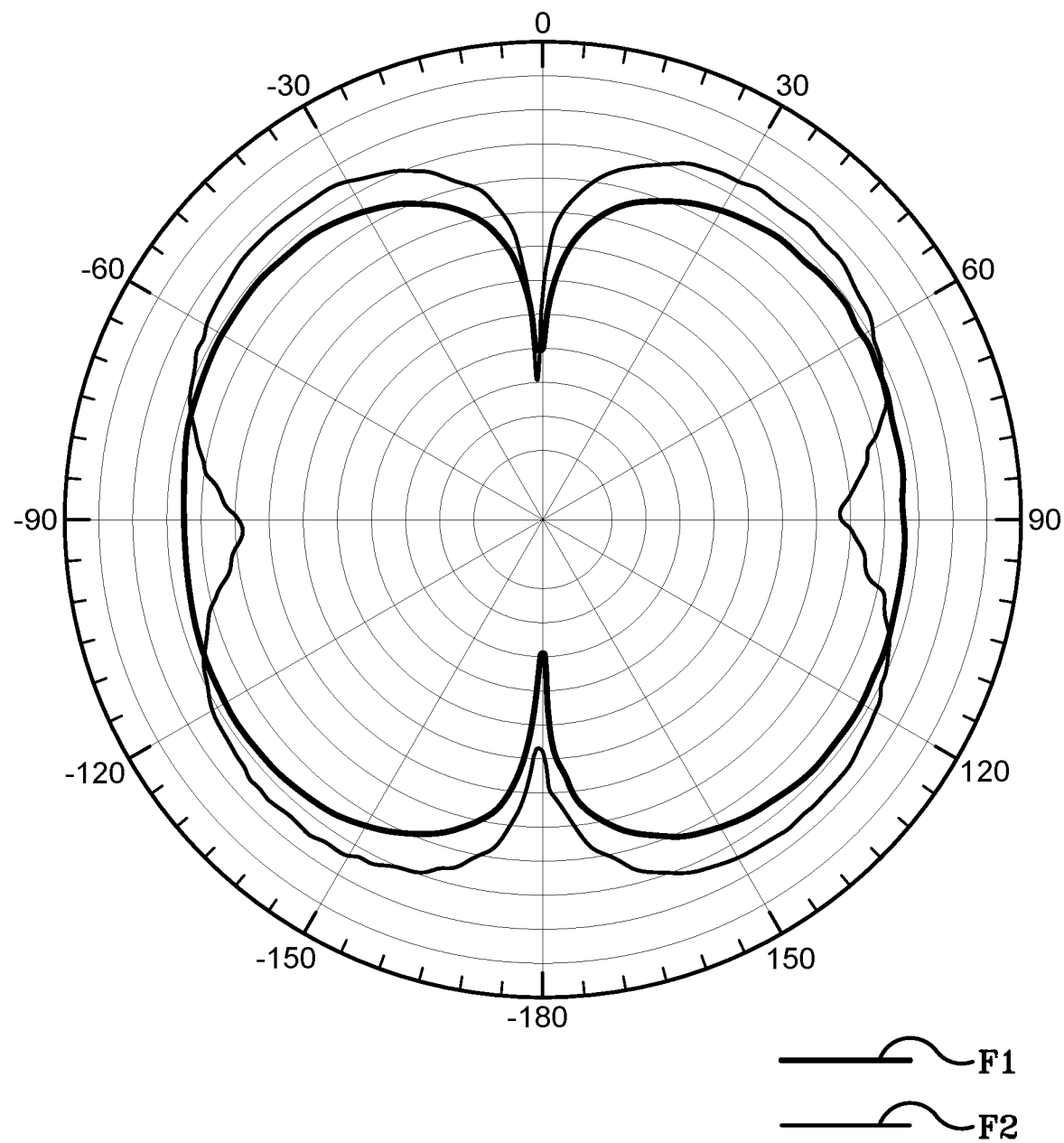
FIG. 15B is a graphical representation of a prior art cross-polarized antenna element azimuth gain model.

With reference to FIGS. 15A-15B, and as discussed herein, prior attempts to create an antenna element suited for direction finding applications and other similar applications having omni-directional radiation patterns have utilized two port 180-degree hybrids to combine the element ports. This configuration has allowed prior antenna elements to achieve separate V-pol and H-pol ports but at the exchange for limiting the bandwidth. Further, these prior antenna elements typically have high loss and do not reliably provide desired phase combinations between the separate V-pol and H-pol ports. As a result, current slot antennas utilizing two orthogonally-arranged slot elements to achieve omni-directional V-pol and H-pol radiation patterns tend to suffer from deep nulls across the field of view.

As illustrated in FIG. 15A, a prior art slot antenna elemental gain graph is shown with representative co-polarized (V-pol) radiation pattern gain measurements taken at a first frequency F1 band (illustrated by the bold line) and a second, higher frequency band F2 (thin line). The first frequency F1 band is representative of a general frequency band, such as approximately 15-20 GHz, but will be understood to represent a typical, existing antenna element radiation pattern indicating the attenuation of the signal as it approaches zero and 180-degrees around the azimuth. Similarly, the second frequency F2 band is representative of a higher general frequency band, such as approximately 30-40 GHz, showing similar attenuation of the radiation pattern illustrated by the flattening of the curves at the top and bottom of the image at approximately zero and 180-degrees azimuth. Other frequency measurements were similar across other frequency bands of interest, for example, 18-50 GHz, but inclusive of other frequency bands as dictated by the desired implementation.

As seen in FIG. 15B, this effect is even more pronounced at zero and 180-degrees azimuth for the cross-polarization (H-pol) radiation patterns where the signal drops down to nearly zero. Again, the bold line indicates the first frequency band F1 and the thin line indicates the second frequency band F2. In this graph, the signals drop significantly at zero and 180-degrees, providing deep nulls in the signals.

In addition to the deep nulls and flattened signal profiles shown in FIGS. 15A and 15B, current antenna elements further suffer from decreased power handling ability from the use of small push-on connectors, which can introduce a source RF leakage when utilized in several applications, including direction finding applications.

Contrast this with the present design utilizing the pair of chevron slots, namely, first slot and second slot 40 and 42, using a ridged waveguide magic-t feed 16 and microstrip probe boards 30 and the benefits are readily apparent. Specifically, the inclusion of Δ and Σ ports 18 and 20 of the waveguide magic-t correspond to the separate V-pol and H-pol ports, respectively. The separation of the V-pol and H-pol ports 18 and 20 provide optimal operational conditions for antenna element 10 in modern threat environments containing improved and agile emitters. The waveguide magic-t feed 16 operating as a 180-degree four-port hybrid with an addition and subtraction option (i.e. Δ and Σ ports 18 and 20) can provide an operational bandwidth ratio (e.g. a voltage standing wave ratio (VSWR)) of approximately 2.7 to one (as compared to typical bandwidth rations for waveguide based designs of approximately 1.5:1). The present design further provides improved H-pol performance and improved power handling, and further allows for direct mounting of power amplifiers at the microstrip feeds to maximize power handling and minimize losses for transmit applications.

Figure 16A:
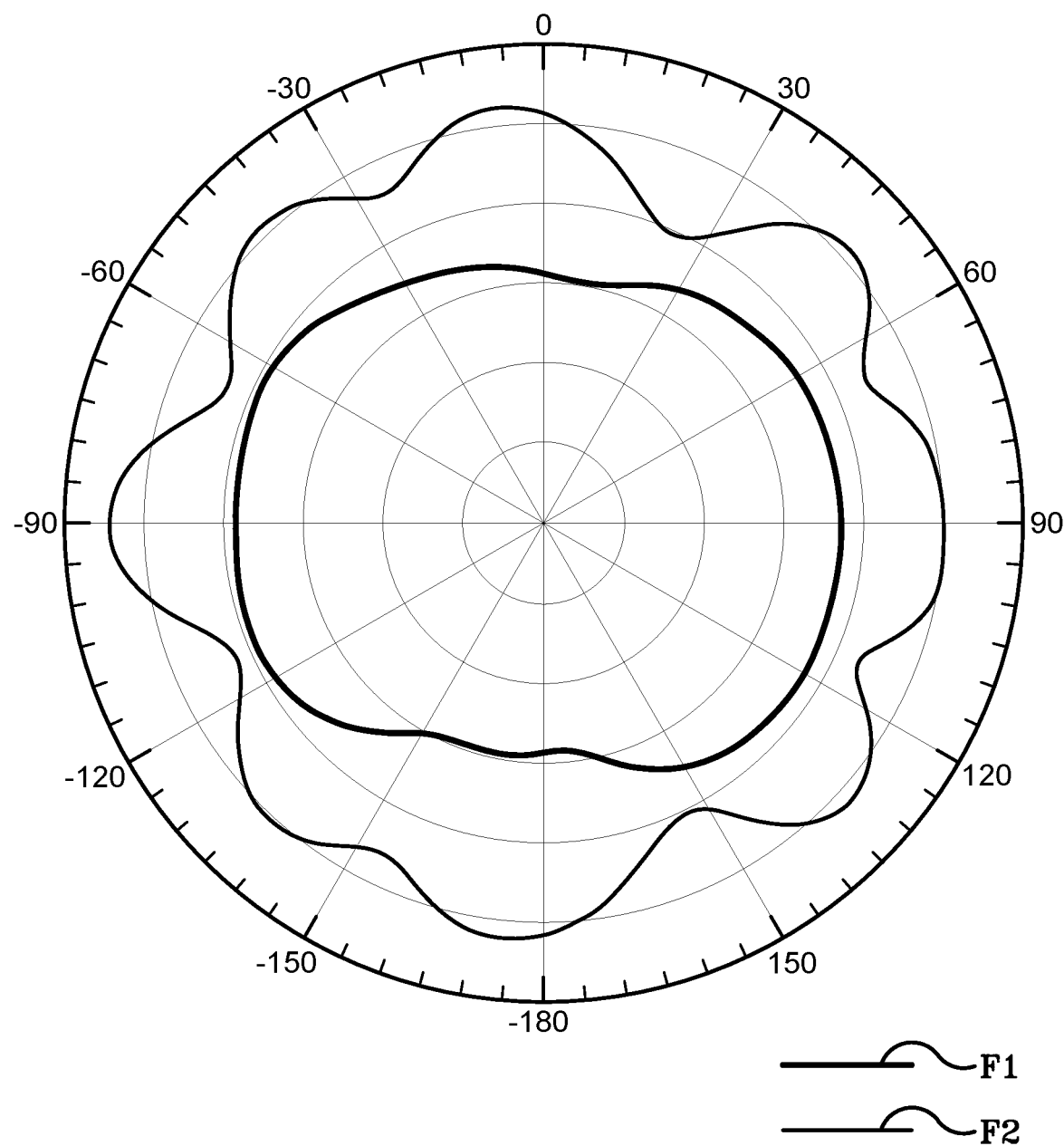
FIG. 16A is an exemplary graphical representation of co-polarized antenna element azimuth gain model for an antenna element, according to one aspect of the present disclosure.
Figure 16B:
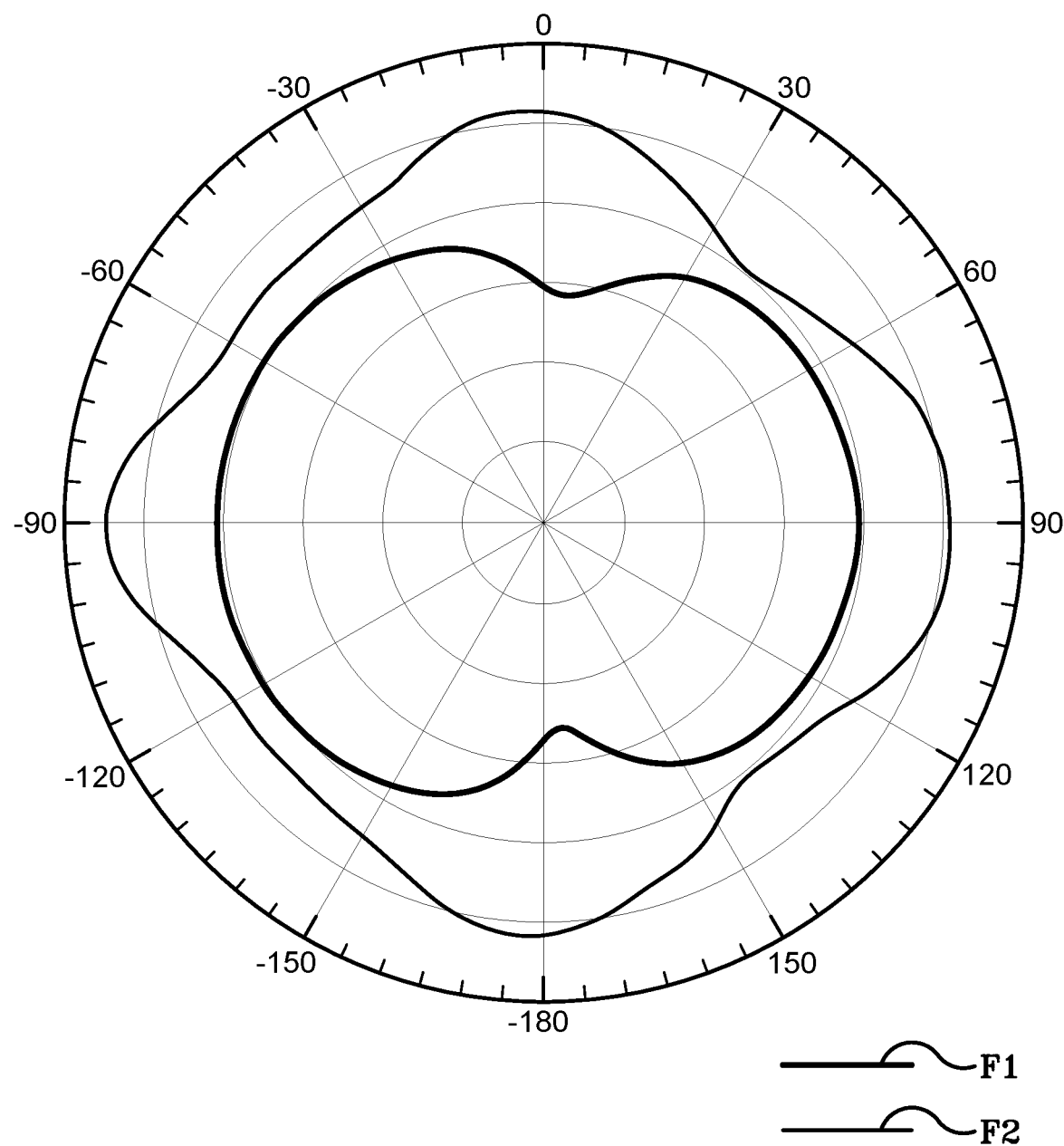
FIG. 16B is an exemplary graphical representation of cross-polarized antenna element azimuth gain model for an antenna element, according to one aspect of the present disclosure.

As seen then in FIGS. 16A and 16B, utilization of the four-port magic-t feed 16 reduces or eliminates the flattening patterns and deep nulls across the field of view for the realized gain. In FIG. 16A, the present antenna element 10 co-polarized (V-pol) radiation pattern gain measurements taken at the first frequency band F1 (again, illustrated by the bold line) and the second frequency band F2 (thin line). As with the prior art graphs in FIGS. 15A and 15B, these measurements are representative and other frequency measurements were similar across the frequency bands of interest. At the first frequency band F1, there is a slight flattening of the signal around zero and 180-degrees around the azimuth, but it is less pronounced than the prior art systems. At the second frequency band F2, the signal adopts a more wavelike appearance, but avoids significant drops or nulls around the azimuth.

Similarly, as seen in FIG. 16B, the cross-polarization (H-pol) radiation patterns do not suffer the deep nulls of the prior art systems at zero and 180-degrees around the azimuth. Instead, the frequency band F1 signal, while showing some attenuation near zero and 180-degrees, remains within acceptable ranges. The second frequency band F2 signal likewise does not suffer the nulls of the prior art, and in fact shows increased gain at zero and 180-degrees.

Accordingly, it is seen that the present design offers improved performance 360-degrees around the azimuth with improved gain performance, particularly at zero and 180-degrees, as compared to prior antenna elements. This is true both for V-pol radiation patterns (FIG. 16A) and for H-pol radiation patterns (FIG. 16B).

As discussed above, the waveguide magic-t feed 16 may be constructed utilizing standard metal and polymer production techniques and/or additive manufacturing, which may allow further customization and scalability to the ridged waveguide magic-t feed 16. This may allow specific form to be modified slightly for use in legacy systems and/or for use across different operational environments. Additionally, for non-direction finding applications, the waveguide magic-t may be readily modified or otherwise adapted to enhance specific functionality, as desired.

Antenna elements 10A and 10B utilizing magic-t feeds 16 to feed the chevron slot arch elements may be operated similar to other systems while still maintaining the benefits described herein. According to one aspect, antenna element 10 may be operated in accordance with standard transmission protocols for direction finding applications, such as correlation interferometry direction finding, or for other suitable applications. The configuration and construction of the antenna elements 10 provided herein may impart the discussed benefits even through normal operation thereof.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment,"

"an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An antenna element comprising:
   a slot plate defining a first slot and a second slot therethrough, the first and second slots arranged orthogonally relative to each other;
   a first element port in operable communication with the slot plate and the first slot;
   a first parallel plate pair on the first element port and in operable communication with the slot plate;
   a second element port in operable communication with the slot plate and the second slot;
   a second parallel plate pair on the second element port and in operable communication with the slot plate;
   a cup defining an air cavity below the slot plate and containing the first and second element ports and first and second parallel plate pairs therein;
   a difference port in operable connection with a first microstrip probe board;
   a sum port in operable connection with a second microstrip probe board; and
   a four-port hybrid magic tee (magic-t) waveguide feed operable to feed the first element port, the second element port, the difference port, and the sum port.

2. The antenna element of claim 1 wherein the waveguide magic-t further comprises:
   a first port transition section operable to connect a first element feed with the first element port; and
   a second port transition section operable to connect a second element feed with the second element port;
   wherein the first and second transition sections allow the waveguide magic-t to transition from the first and second ports to a traditional waveguide at the first and second element feeds.

3. The antenna element of claim 2 wherein the waveguide magic-t further comprises:
   a third transition section in operable communication with the difference port; and
   a fourth transition section in operable communication with the sum port.

4. The antenna element of claim 1 wherein the first and second parallel plate pairs each further comprise:
   a first end in operable communication with the slot plate; and
   a second end opposite the first end;
   wherein the first end has a thickness that is greater than a thickness of the second end.

5. The antenna element of claim 1 further comprising:
   a radome in operable communication with the slot plate.

6. The antenna element of claim 5 wherein the radome further comprises:
   a first slot projection extending into the first slot defined through the slot plate; and
   a second slot projection extending into the second slot defined through the slot plate.

7. The antenna element of claim 6 wherein the first slot projection extends through the first slot and is in contact with the first element port and the second slot projection extends through the second slot and is in contact with the second element port.

8. The antenna element of claim 5 further comprising:
   a ground plane.

9. The antenna element of claim 8 wherein the radome is embedded in the ground plane and is substantially planar therewith.

10. The antenna element of claim 9 wherein the antenna element is conformal with the ground plane.

11. An antenna element comprising:
    a slot plate defining a first slot and a second slot therethrough, the first and second slots arranged orthogonally relative to each other;
    a first element port in operable communication with the slot plate and the first slot;
    a second element port in operable communication with the slot plate and the second slot;
    a difference port in operable connection with a first microstrip probe board;
    a sum port in operable connection with a second microstrip probe board; and a four-port hybrid magic tee (magic-t) waveguide feed operable to feed the first element port, the second element port, the difference port, and the sum port.

12. The antenna element of claim 11 wherein the waveguide magic-t further comprises:
a first port transition section operable to connect a first element feed with the first element port; and
a second port transition section operable to connect a second element feed with the second element port;
wherein the first and second transition sections allow the waveguide magic-t to transition to the first and second ports from a traditional waveguide at the first and second element feeds.

13. The antenna element of claim 12 wherein the waveguide magic-t further comprises:
a third transition section in operable communication with the difference port; and
a fourth transition section in operable communication with the sum port.

14. The antenna element of claim 12 wherein the first port transition section further comprises:
a ridged waveguide transitioning from the first element feed directly to the first element port and to the first slot defined in the slot plate.

15. The antenna element of claim 12 wherein the second port transition section further comprises:
a ridged waveguide transitioning from the second element feed directly to the second element port and to the second slot defined in the slot plate.

16. The antenna element of claim 11 further comprising:
a radome in operable communication with the slot plate.

17. The antenna element of claim 16 wherein the radome further comprises:
a first slot projection extending into the first slot defined through the slot plate; and
a second slot projection extending into the second slot defined through the slot plate.

18. The antenna element of claim 17 wherein the first slot projection extends through the first slot and is in contact with the first element port and the second slot projection extends through the second slot and is in contact with the second element port.

19. The antenna element of claim 16 further comprising:
a ground plane; wherein the radome is embedded in the ground plane and is substantially planar therewith.

20. The antenna element of claim 19 wherein the antenna element is conformal with the ground plane.

* * * * *